(12) United States Patent
Seo et al.

(10) Patent No.: US 7,783,172 B2
(45) Date of Patent: Aug. 24, 2010

(54) METHOD AND APPARATUS FOR REPRODUCING DATA FROM RECORDING MEDIUM USING LOCAL STORAGE

(75) Inventors: Kang Soo Seo, Anyang-si (KR); Jea Yong Yoo, Seoul (KR); Byung Jin Kim, Seongnam-si (KR); Kun Suk Kim, Anyang-si (KR); Min Jae Chon, Yongin-si (KR)

(73) Assignee: LG Electronics Inc., Seoul (KR)

( * ) Notice: Subject to any disclaimer, the term of this patent is extended or adjusted under 35 U.S.C. 154(b) by 970 days.

(21) Appl. No.: 11/292,105

(22) Filed: Dec. 2, 2005

(65) Prior Publication Data

US 2006/0120223 A1 Jun. 8, 2006

Related U.S. Application Data

(60) Provisional application No. 60/632,645, filed on Dec. 3, 2004.

(30) Foreign Application Priority Data

Jun. 2, 2005 (KR) ...................... 10-2005-0047141

(51) Int. Cl.
*H04N 5/00* (2006.01)
(52) U.S. Cl. ........................ 386/125; 386/95; 369/30.01
(58) Field of Classification Search .............. 369/30.01; 386/125, 95
See application file for complete search history.

(56) References Cited

U.S. PATENT DOCUMENTS

| 5,596,565 A | 1/1997 | Yonemitsu et al. |
| 5,644,782 A | 7/1997 | Yeates et al. |
| 5,778,389 A | 7/1998 | Pruett et al. |

(Continued)

FOREIGN PATENT DOCUMENTS

CA 2373641 9/2001

(Continued)

OTHER PUBLICATIONS

International Search Report Dated May 17, 2006.

(Continued)

*Primary Examiner*—Thai Tran
*Assistant Examiner*—Girumsew Wendmagegn
(74) *Attorney, Agent, or Firm*—Harness, Dickey & Pierce

(57) ABSTRACT

A method and apparatus for reproducing data from a recording medium using a local storage is disclosed. A method and apparatus for downloading data associated with the recording medium from an external part, and reproducing the downloaded data is disclosed. A binding unit combined with the recording medium from among the downloaded data of the local storage is formed, and is combined with files of the recording medium using the binding information, such that the virtual package is formed. Data of the recording medium and/or data of the local storage are reproduced by the virtual package. If a specific file contained in the binding unit is equal to a specific file contained in the recording medium when the virtual package is formed, priority is assigned to the file of the binding unit so that the virtual package is formed. Therefore, data of the recording medium and data of the local storage can be effectively reproduced at the same time, resulting in greater convenience of a user.

24 Claims, 15 Drawing Sheets

U.S. PATENT DOCUMENTS

| | | |
|---|---|---|
| 5,930,768 A | 7/1999 | Hooban |
| 5,982,980 A | 11/1999 | Tada |
| 6,021,438 A | 2/2000 | Duvvoori et al. |
| 6,269,371 B1 | 7/2001 | Ohnishi |
| 6,381,202 B1 | 4/2002 | Shimoda |
| 6,675,382 B1 | 1/2004 | Foster |
| 6,775,803 B1 | 8/2004 | Chung et al. |
| 6,928,613 B1 | 8/2005 | Ishii et al. |
| 6,938,005 B2 | 8/2005 | Iverson et al. |
| 6,980,979 B2 | 12/2005 | Huang et al. |
| 7,039,863 B1 | 5/2006 | Caro et al. |
| 7,191,392 B1 | 3/2007 | Coar |
| 7,233,553 B2 | 6/2007 | Gotoh et al. |
| 7,349,923 B2 | 3/2008 | Spring et al. |
| 7,477,833 B2 | 1/2009 | Kato et al. |
| 7,555,483 B2 | 6/2009 | Maeda et al. |
| 7,639,923 B2 | 12/2009 | Ikeda et al. |
| 2001/0015940 A1 | 8/2001 | Yokota et al. |
| 2001/0026502 A1 | 10/2001 | Zimmer |
| 2001/0037356 A1 | 11/2001 | White et al. |
| 2002/0001395 A1 | 1/2002 | Davis et al. |
| 2002/0048224 A1 | 4/2002 | Dygert et al. |
| 2002/0143795 A1 | 10/2002 | Fletcher et al. |
| 2002/0161571 A1 | 10/2002 | Matsushima et al. |
| 2002/0194618 A1 | 12/2002 | Okada et al. |
| 2003/0041110 A1 | 2/2003 | Wenocur et al. |
| 2003/0056029 A1 | 3/2003 | Huang et al. |
| 2003/0072453 A1 | 4/2003 | Kelly et al. |
| 2003/0105743 A1 | 6/2003 | Ireton |
| 2003/0109306 A1 | 6/2003 | Karmarkar |
| 2003/0152366 A1 | 8/2003 | Kanazawa et al. |
| 2003/0163486 A1 | 8/2003 | Van Der Meulen |
| 2003/0180031 A1 | 9/2003 | Kikuchi et al. |
| 2003/0202431 A1 | 10/2003 | Kim et al. |
| 2003/0228134 A1 | 12/2003 | Kim et al. |
| 2003/0235406 A1 | 12/2003 | Seo et al. |
| 2004/0051812 A1 | 3/2004 | Hayward |
| 2004/0054541 A1 | 3/2004 | Kryze et al. |
| 2004/0078293 A1 | 4/2004 | Iverson et al. |
| 2004/0101285 A1 | 5/2004 | Seo et al. |
| 2004/0120695 A1 | 6/2004 | Tsumagari et al. |
| 2004/0199566 A1 | 10/2004 | Carlson et al. |
| 2004/0210584 A1 | 10/2004 | Nir et al. |
| 2004/0235402 A1 | 11/2004 | Bjelopavlic et al. |
| 2005/0018854 A1 | 1/2005 | Yamamoto et al. |
| 2005/0108466 A1 | 5/2005 | Takashima et al. |
| 2005/0141879 A1 | 6/2005 | Chung et al. |
| 2005/0169132 A1 | 8/2005 | Kuraoka et al. |
| 2005/0262149 A1 | 11/2005 | Jung et al. |
| 2006/0013562 A1 | 1/2006 | Sugino et al. |
| 2006/0020932 A1 | 1/2006 | Bentz et al. |
| 2006/0045481 A1 | 3/2006 | Yahata et al. |
| 2006/0051062 A1 | 3/2006 | Kusaka et al. |
| 2006/0140079 A1 | 6/2006 | Hamada et al. |
| 2006/0143666 A1 | 6/2006 | Okada et al. |
| 2006/0153535 A1 | 7/2006 | Chun et al. |
| 2006/0155790 A1 | 7/2006 | Jung et al. |
| 2006/0156354 A1 | 7/2006 | Jung et al. |
| 2006/0227973 A1 | 10/2006 | Takashima et al. |
| 2007/0006276 A1 | 1/2007 | Ashley et al. |
| 2007/0038989 A1 | 2/2007 | Newton et al. |
| 2007/0143740 A1 | 6/2007 | Hoerentrup et al. |
| 2008/0025182 A1* | 1/2008 | Seo et al. ............ 369/85 |
| 2008/0031599 A1 | 2/2008 | Ikeda et al. |

FOREIGN PATENT DOCUMENTS

| | | |
|---|---|---|
| CN | 1353419 | 6/2002 |
| CN | 1387664 | 12/2002 |
| CN | 1898742 A | 1/2007 |
| CN | 1954384(A) | 4/2007 |
| EP | 0 101 133 | 2/1984 |
| EP | 0 737 912 | 10/1996 |
| EP | 0 737 975 | 10/1996 |
| EP | 0 801 384 | 10/1997 |
| EP | 1 014 372 | 6/2000 |
| EP | 1 032 229 | 8/2000 |
| EP | 1 408 505 | 4/2004 |
| EP | 1 426 961 | 6/2004 |
| EP | 1 437 737 | 7/2004 |
| EP | 1 513 152 | 3/2005 |
| EP | 1 536 427 A1 | 6/2005 |
| EP | 1 551 027 | 7/2005 |
| EP | 1 553 769 | 7/2005 |
| EP | 1 789 958 | 3/2006 |
| EP | 1 679 603 | 7/2006 |
| EP | 1 718 074 | 11/2006 |
| JP | 11-065996 | 3/1999 |
| JP | 11-249948 | 9/1999 |
| JP | 11-249963 | 9/1999 |
| JP | 11-288580 | 10/1999 |
| JP | 2002-049518 | 2/2002 |
| JP | 2002-288941 | 10/2002 |
| JP | 2004-078265 | 3/2004 |
| JP | 2004-214918 | 7/2004 |
| JP | 2006-40473 | 2/2006 |
| KR | 10-2004-039885 | 5/2004 |
| RU | 2006117983(A) | 12/2007 |
| TW | 583538 | 4/2004 |
| WO | WO 95/12197 | 5/1995 |
| WO | WO 96/11446 | 4/1996 |
| WO | WO 01/67668 | 9/2001 |
| WO | WO 2004/001752 | 12/2003 |
| WO | WO 2004/001754 | 12/2003 |
| WO | WO 2004/023479 | 3/2004 |
| WO | WO 2004/025651 | 3/2004 |
| WO | WO 2004/030356 | 4/2004 |
| WO | WO 2004/042723 | 5/2004 |
| WO | WO 2004/047100 | 6/2004 |
| WO | WO 2004/047104 | 6/2004 |
| WO | WO 2004/081936 | 9/2004 |
| WO | WO 2004/100048 A2 | 11/2004 |
| WO | WO 2004/114658 | 12/2004 |
| WO | WO 2005/002220 | 1/2005 |
| WO | WO 2005/033948 | 4/2005 |
| WO | WO 2005/045834 | 5/2005 |
| WO | WO 2005/050528 | 6/2005 |
| WO | WO 2005/052941 | 6/2005 |
| WO | WO 2005/055205 | 6/2005 |
| WO | WO 2005/078727 | 8/2005 |
| WO | WO 2005/079063 | 8/2005 |
| WO | WO 2005/091637 | 9/2005 |
| WO | WO 2005/124763 | 12/2005 |
| WO | WO 2006/009305 | 1/2006 |

OTHER PUBLICATIONS

Chinese Office Action dated Aug. 8, 2008.
European Search Report dated Sep. 17, 2008.
Chinese Office Action dated May 8, 2009.
Russian Office Action dated Jun. 23, 2009.
Office Action for U.S. Appl. No. 11/224,245 dated May 12, 2009.
Office Action for U.S. Appl. No. 11/246,231 dated Aug. 18, 2009.
Little et al., "Forensic 3D Scene Reconstruction," Nov. 2, 1999, Sandia National Laboratories, p. 1-8 <retrieved from USDOE information bridge on May 10, 2009>.
U.S. Office Action mailed Sep. 18, 2009 issued in corresponding U.S. Appl. No. 11/325,341.
Russian Notice of Allowance dated Sep. 24, 2009 (w/English Translation).
Search Report for European patent application No. 05786904.2 dated Nov. 10, 2009.
Blu-Ray Disc Founders: "White paper Blu-ray Disc Format—2.A Logical and Audio Visual Application Format Specifications for BD- RE," Internet Citation, [Online] Aug. 1, 2004, pp. 1-26, XP007904846, retrieved from Internet: URL:http://www.blurayjukebox.com/html/blu-ray_whitepapers.html> [retrieved on Aug. 30, 2005].

Blu-Ray Disc Founders: "White paper, Blu-Ray Disc Format: General," Internet Citation, [Online] Aug. 1, 2004, pp. 1-37, XP002547994, retrieved from Internet: URL:http://www.blu-raydisc.com/Assets/Downloadablefile/general_bluraydiscformat-15263.pdf> [retrieved on Oct. 7, 2009].

Blu-Ray Disc Founders: "White paper Blu-Ray Disc Format: 3. File System Specifications for BD-RE, R, Rom," Internet Citation, [Online], Aug. 1, 2004, XP002330712, retrieved from Internet: URL:http://www.blu-raydisc.com/Section_13628/Index.html> [retrieved on Jun. 6, 2005].

Office Action for U.S. Appl. No. 11/325,493 dated Nov. 23, 2009.

Search Report for European application No. 05819111 dated Nov. 20, 2009.

Search Report for European application No. 05786908 dated Nov. 30, 2009.

Blu-Ray Disc: "White Paper Blu-ray Disc Format. 2.B Audio Visual Application Format Specifications for BD-ROM" Internet Citation, [Online] XP007903517 Retrieved from the internet: URL:http://www.blu-raydisc.com/assets/downloadable_file/2b_bdrom_audiovisualapplication_0305-12955-13403.pdf> [retrieved on Nov. 16, 2007].

"Application Definition Blu-ray Disc Format BD-J Baseline Application and Logical Model Definition for BD-ROM" Internet Citation, [Online] Mar. 1, 2005, pp. 1-45, XP007904998, retrieved from the internet: URL:http://www.blurayjukebox.com/pdfs/bdj_gem_application_defintion_0503_07-13404> [retrieved on Jun. 18, 2008].

Office Action for U.S. Appl. No. 11/325,460 dated Feb. 17, 2010.

Notice of Allowance for Russian patent application No. 2007115808 dated Feb. 2, 2010 (in English translation).

Office Action for U.S. Appl. No. 11/224,245 dated Dec. 11, 2009.

Office Action for U.S. Appl. No. 11/325,493 dated Apr. 1, 2010.

Patent Gazette for corresponding Chinese Application No. 200610073975.2 dated May 12, 2010.

Search Report for corresponding European Application No. 05 82 6398.9 dated May 28, 2010.

* cited by examiner

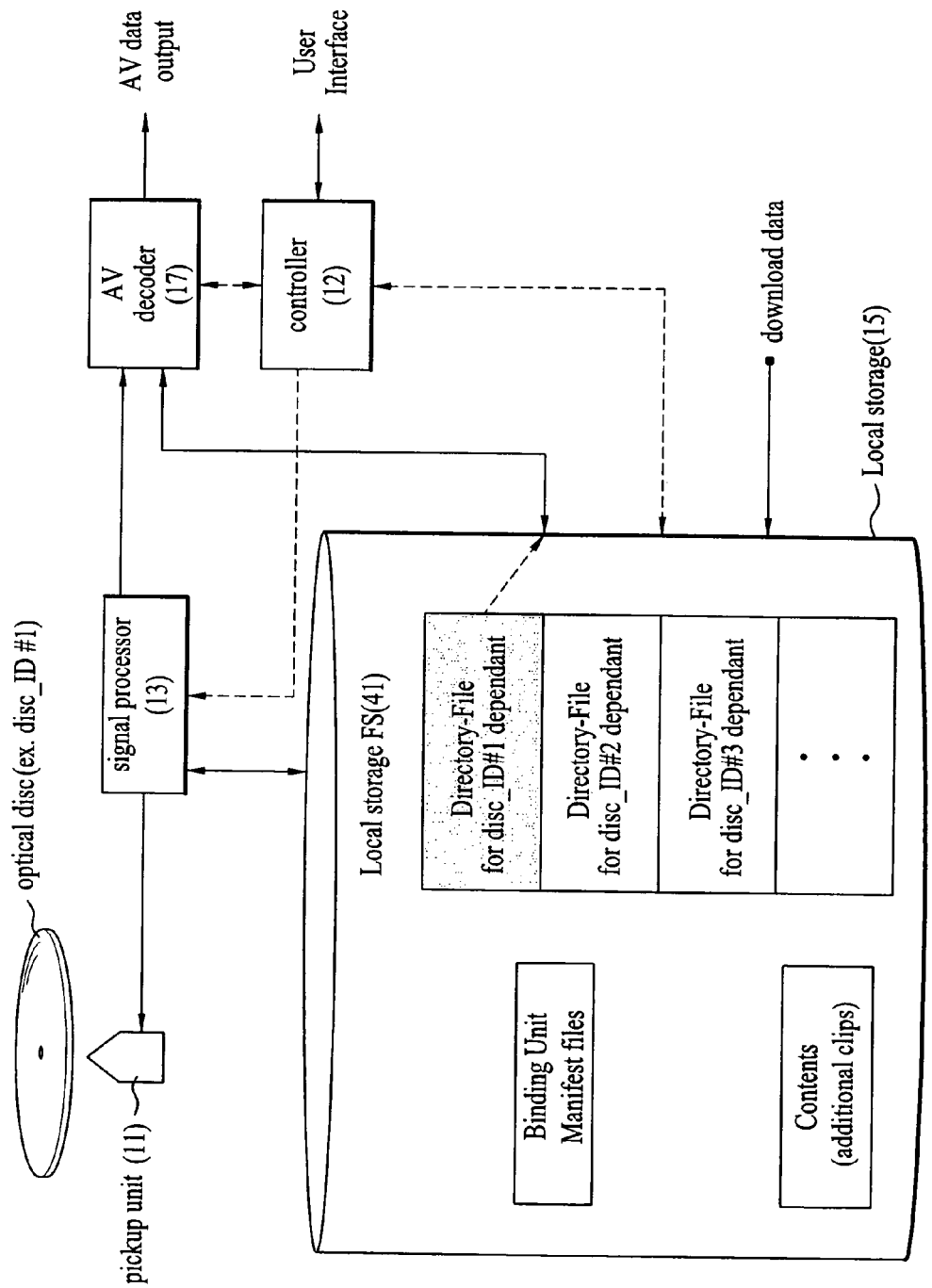

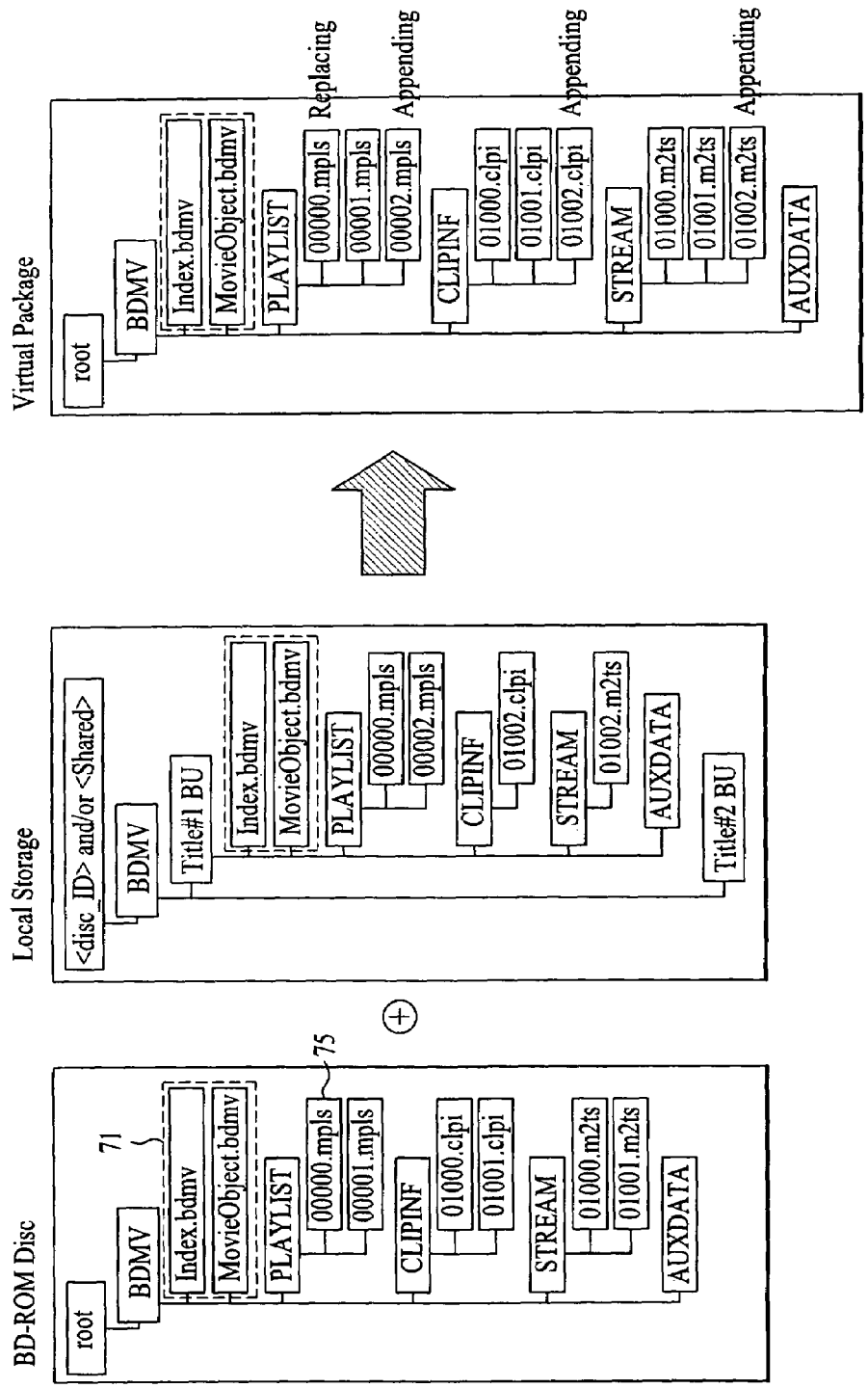

METHOD AND APPARATUS FOR REPRODUCING DATA FROM RECORDING MEDIUM USING LOCAL STORAGE

This application claims the benefit of the U.S. Provisional Application No. 60/632,645, filed on Dec. 3, 2004, in the name of inventors Kang Soo SEO, Jea Yong YOO, and Byung Jin Kim, entitled "METHOD OF MANAGING LOCAL STORAGE FOR HIGH DENSITY OPTICAL DISC", which is hereby incorporated by reference as if fully set forth herein.

This application claims the benefit of Korean Patent Application No. 10-2005-0047141 filed on Jun. 2, 2005 which is hereby incorporated by reference as if fully set forth herein.

BACKGROUND OF THE INVENTION

1. Field of the Invention

The present invention relates to a method and apparatus for reproducing data from a recording medium, and more particularly to a method and apparatus for reproducing data from a recording medium using a local storage contained in an optical recording/reproducing device.

2. Discussion of the Related Art

Generally, there has been widely used an optical disc acting as a recording medium capable of recording a large amount of data therein. Particularly, there has recently been developed a high-density optical recording medium capable of recording/storing high-quality video data and high-quality audio data for a long period of time, for example, a Blu-ray Disc (BD).

The BD based on the next-generation recording medium technique has been considered to be the next-generation optical recording solution capable of storing much more data than a conventional DVD. In recent times, many developers have conducted intensive research into the international standard technical specification associated with the BD along with those of other digital devices.

In association with the above-mentioned situation, there has recently been developed an optical recording/reproducing device based on the BD international standard, but the BD international standard has not yet been completed, such that many limitations and problems occur in developing the optical recording/reproducing device.

Particularly, the above-mentioned optical recording/reproducing device must consider not only a basic function for recording/reproducing data of the BD, but also an additional function for enabling the optical recording/reproducing device to interact with peripheral digital devices. In other words, the optical recording/reproducing device must receive an external input signal, must display the received signal, and must reproduce desired data using the external input signal and the BD.

However, an apparatus for reproducing data from the recording medium to simultaneously reproduce the external input signal and data of the BD has not yet been established, such that many limitations and problems occur in developing a BD-based optical recording/reproducing device.

SUMMARY OF THE INVENTION

Accordingly, the present invention is directed to a method and apparatus for reproducing data from a recording medium using a local storage that substantially obviate one or more problems due to limitations and disadvantages of the related art.

An object of the present invention is to provide a method and apparatus for effectively reproducing data recorded in a recording medium and data recorded in a local storage.

Another object of the present invention is to provide a method for forming a virtual package using a binding unit contained in a local storage.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for reproducing data from a recording medium using a local storage comprises the steps of: a) forming a binding unit from among data stored in the local storage; b) binding the binding unit with files contained in the recording medium using binding information, and forming a virtual package, wherein a file of the binding unit has binding priority when the file contained in the binding unit is equal to a file contained in the recording medium; and c) reproducing data recorded in the recording medium and data stored in the local storage using the formed virtual package.

In another aspect of the present invention, there is provided a method for forming a virtual package comprising the steps of: a) forming a binding unit using a binding unit manifest file from among data stored in the local storage; and b) binding the binding unit with files contained in the recording medium, and forming a virtual package using the binding unit manifest file, wherein a file of the binding unit has binding priority when the file contained in the binding unit is equal to a file contained in the recording medium on the basis of the binding unit manifest file.

In yet another aspect of the present invention, there is provided an apparatus for reproducing data from a recording medium using a local storage comprising: a pickup unit for reading original data from the recording medium; a local storage for storing additional data associated with the original data contained in the recording medium; and a controller for forming a virtual file system to reproduce the original data and/or the additional data, and forming a virtual package to reproduce the original data and/or the additional data using the virtual file system, wherein, if a specific file contained in the additional data is equal to a specific file contained in the recording medium, higher priority is assigned to the file of the additional data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4B is a block diagram illustrating an apparatus for reproducing data using a local storage from among overall components contained in the optical recording/reproducing device according to the present invention;

FIGS. 9A~9C are conceptual diagrams illustrating a method for forming/reproducing a virtual package in accordance with a second preferred embodiment of the present invention, specifically, a method for performing a binding operation for combining a binding unit configured in title units (i.e., a binding unit per title) with a recording-medium file structure (i.e., a disc package) such that it forms/reproduces a virtual package.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A method and apparatus for reproducing data from a recording medium using a local storage will hereinafter be described with reference to the annexed drawings.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, and a magnetic tape, etc., according to various recording schemes.

For the convenience of description and better understanding of the present invention, the optical disc, such as a BD, will hereinafter be exemplarily used as the above-mentioned recording medium in the present invention. It should be noted that technical ideas of the present invention can be applied to other recording mediums without departing from the scope and spirit of the invention.

Figure 1:
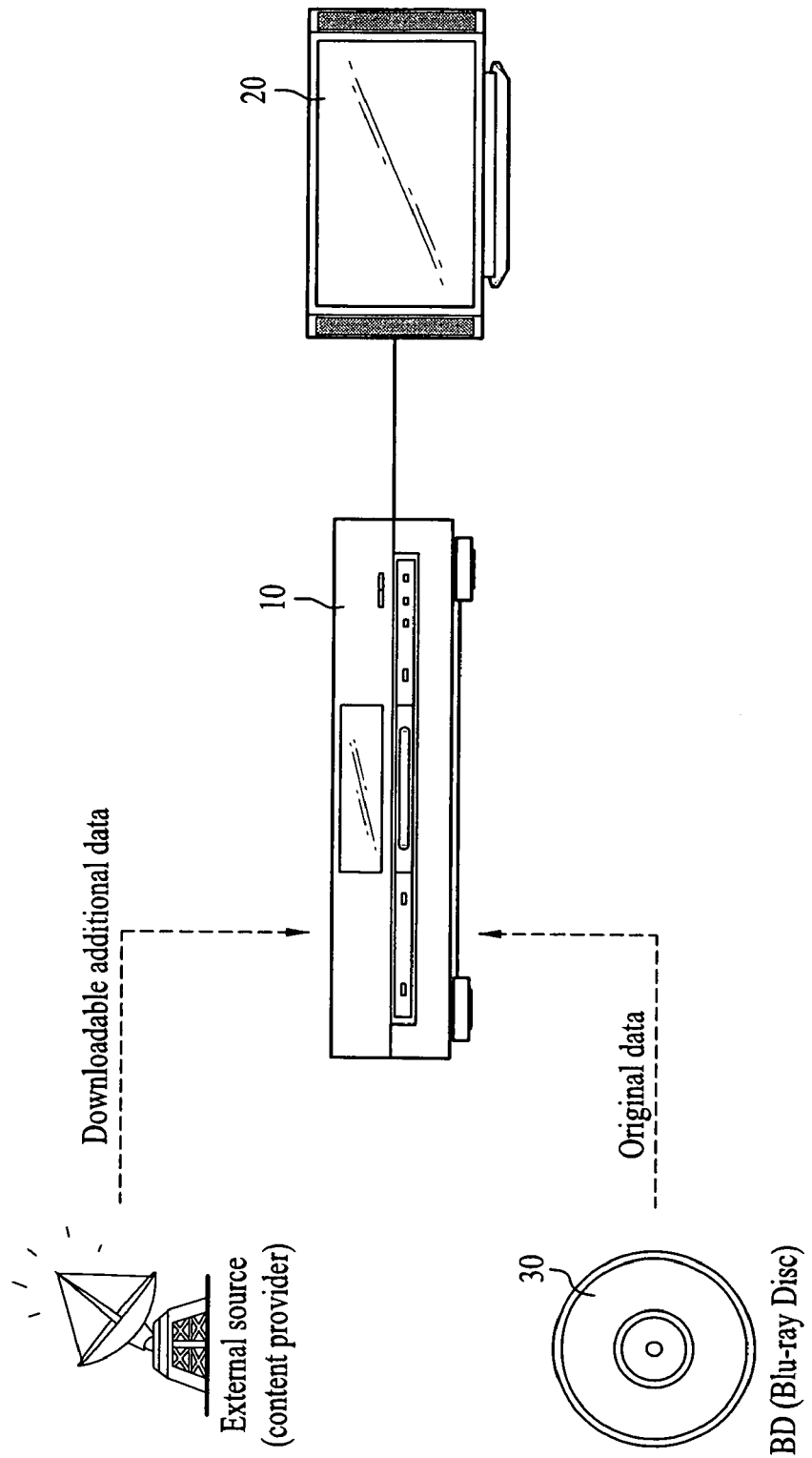
FIG. 1 is a conceptual diagram illustrating a method and apparatus for reproducing data from a recording medium according to the present invention.

The term "local storage" is indicative of a storage unit contained in an optical recording/reproducing device 10 shown in FIG. 1. In more detail, the term "local storage" is indicative of a component capable of receiving necessary information or data from a user, and storing the received information or data. For example, a general local storage may be indicative of a Hard Disc Drive (HDD), but it should be noted that the term "local storage" of the present invention is not limited to the HDD, and is applicable to other examples as necessary.

Particularly, the term "local storage" is indicative of a storage unit for storing data associated with a recording medium such as a BD. The data associated with the recording medium is generally downloaded from an external device.

In association with the above-mentioned description, it is obvious to those skilled in the art that the local storage may directly read some permission data from the recording medium, and may generate system data (e.g., metadata) associated with record/reproduction operations of the recording medium, such that the system data may be stored in the local storage.

The term "binding unit" is indicative of a set of files stored in the local storage. Particularly, the binding unit is indicative of a set of information (i.e., information set) associated with a specific recording medium. In this case, the information set is combined with or is added to a file contained in the recording medium, such that it can simultaneously reproduce data of the recording medium and data of the local storage.

For the convenience of description, data recorded in the recording medium is referred to as "original data", data associated with the recording medium from among a plurality of data units stored in the local storage is referred to as "additional data".

FIG. 1 is a conceptual diagram illustrating a method and apparatus for reproducing data according to the present invention. Unified usages of the optical recording/reproducing 10 and peripheral devices are shown in FIG. 1.

The optical recording/reproducing device 10 can record/reproduce data in/from various optical discs having different formats. If necessary, the optical recording/reproducing device 10 can record/reproduce specific data in/from only a specific optical disc such as a BD, or can reproduce the data from the optical disc without recording the data in the same. It should be noted that the present invention exemplarily uses a BD-player capable of reproducing data from the BD or a BD-recorder capable of recording data in the BD in consideration of correlation between the BD and peripheral devices for the convenience of description. It is well known in the art that the optical recording/reproduction device 10 is also applicable to a drive embedded in a specific device such as a computer.

The optical recording/reproducing device 10 records or reproduces data in/from the optical disc 30, receives an external input signal, performs a signal process on the received signal, and transmits the signal processed result to the external display 20, such that a user can view the signal processed result on the display 20. In this case, there is no limitation in a receivable external signal. For example, representative external input signals may be determined to be a DTV-associated signal and an Internet-associated signal, etc. Specifically, the Internet is indicative of a communication network to which a user easily gains access, such that the user can download specific Internet data using the optical recording/reproducing device 10, and can use the downloaded data.

In association with the above-mentioned description, a person for providing content data used as an external source is generally referred to as a content provider (CP).

When original data is recorded in the optical disc 30 seated in the optical recording/reproducing device 10, and additional data associated with the original data is present in other storage places (e.g., Internet), the present invention aims to reproduce the original data and the additional data at the same time.

For example, it is assumed that multiplexed AV (Audio/Video) streams are recorded as the original data recorded in the optical disc, and additional data for use in the Internet is an audio stream different from an audio stream (e.g., Korean) of the original data. In this case, some users may download a specific audio stream (e.g., English) acting as additional data from the Internet, may desire to reproduce the downloaded audio stream along with the AV stream acting as original data, or may desire to reproduce only the additional data. In order to implement the above-mentioned desires of the users, correlation between the original data and the additional data must be established, and there is needed a systemized method for managing/reproducing the above-mentioned data according to a user request.

For the convenience of description, although a signal recorded in the disc is called the original data, and other signals existing in the outside of the disc are called the additional data, it should be noted that the original data and the additional data are not limited to only specific data.

Generally, additional data may be indicative of audio data, presentation graphic (PG) data, interactive graphic (IG) data, or text subtitle, etc., but the additional data may also be indicative of a multiplexed AV stream including the above-mentioned data and video data. In other words, data associated with the original data simultaneously existing in the outside of the optical disc may act as additional data.

In order to satisfy the above-mentioned user requests, a predetermined file structure must be established between the original data and the additional data. Accordingly, a file structure and data record structure for use in the BD will hereinafter be described with reference to FIGS. 2~3.

Figure 2:
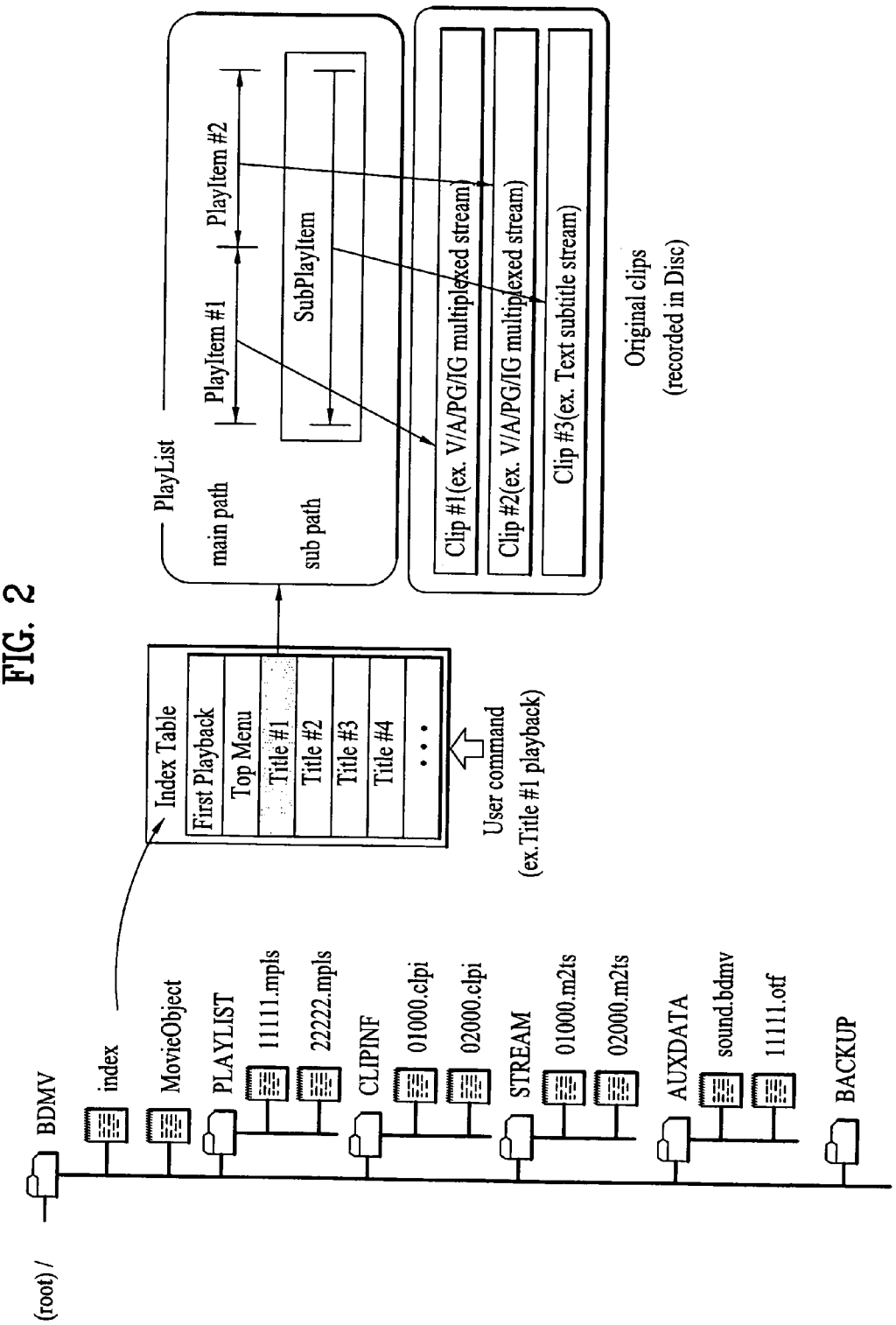
FIG. 2 is a conceptual diagram illustrating a file structure recorded in an optical disc acting as a recording medium and a method for reproducing a specific title using the file structure.

FIG. 2 is a conceptual diagram illustrating a file structure for reproducing/managing the original data recorded in an optical disc, and a method for reproducing a specific title according to the file structure.

An example of the above-mentioned file structure is shown in FIG. 2. The file structure according to the present invention includes one or more BD directories (BDMV) under a single root directory. The BD directory (BDMV) includes not only an index file "index" acting as a general file (i.e., an upper file) capable of guaranteeing user interactivity, but also the above-mentioned object. The file structure includes a variety of directories for storing information of actual data recorded in a disc and other information associated with a method for reproducing the data, for example, a playlist directory (PLAYLIST), a clip information directory (CLIPINF), a stream directory (STREAM), an auxiliary directory (AUX-DATA), and a backup directory (BACKUP). The above-mentioned directories and a variety of files included in the directory will hereinafter be described.

The AUXDATA directory includes an additional data file for reproducing data of the disc. For example, the AUXDATA directory includes a "Sound.bdmv" file for providing a user with sound data when an interactive graphic function is executed, and an "11111.otf" file for providing the user with font information when data of the disc is reproduced.

The stream directory (STREAM) includes a plurality of AV stream files recorded in a disc according to a specific format. Generally, individual streams are recorded using an MPEG-2 based transport packet, and the stream directory (STREAM) uses extension names of stream files (01000.m2ts and 02000.m2ts) as a specific extension name "*.m2ts". Particularly, if video/audio/graphic information from among the above-mentioned streams is multiplexed, the multiplexed information is called an AV stream, and a single title is composed of at least one AV stream file.

The clip information (Clip-info) directory (CLIPINF) is composed of a plurality of clip-info files (01000.clpi and 02000.clpi) connected to the above-mentioned stream files on a one-to-one basis. Particularly, the clip-info files (*.clpi) record attribute information and timing information of the stream files (*.m2ts) therein. The clip-info files (*.clpi) connected to the stream files (*.m2ts) on a one-to-one basis are generically named a "Clip". In other words, this means that a single clip is indicative of data composed of a stream file (*.m2ts) and a clip-info file (*.clpi). A clip recorded in the disc is referred to as an original clip. A clip, which is downloaded and stored in a local storage, is referred to as an additional clip.

The playlist directory (PLAYLIST) includes a plurality of playlist files (*.mpls). Each playlist file (*.mpls) includes one or more playitems (PlayItem) and one or more sub-playitems (SubPlayItem). Each playitem (PlayItem) and each sub-playitem (SubPlayItem) are adapted to designate a playing interval during which a specific clip is reproduced. The playitem (PlayItem) and the sub-playitem (SubPlayItem) include information associated with a specific clip to be reproduced, i.e., information associated with a reproduction start time (IN-Time) and other information associated with a reproduction termination time (OUT-Time) of the specific clip.

In association with the above-mentioned description, a process for reproducing data using at least one playitem (PlayItem) in the playlist file is referred to as a main path, and a process for reproducing data using individual sub-play items (SubPlayItem) is referred to as a sub-path. The playlist file must contain a single main path. The playlist file may contain at least one sub-path according to the presence or absence of the sub-playitem (SubPlayItem) as necessary.

In conclusion, the playlist file acts as a basic reproduction/management file unit contained in overall reproduction/management file structures for reproducing a desired clip by combination of one or more playitems (PlayItem).

The backup directory (BACKUP) stores a plurality of duplicate files, i.e., a duplicate file (also called "copied files") of the index file "index" storing information associated with disc reproduction, a duplicate file of the object file "MovieObject", duplicate files of all playlist files (*.mpls) contained in the playlist directory (PLAYLIST), and duplicate files of all clip-info files (*.clpi) contained in the clip-info directory (CLIPINF). If the above-mentioned files ("index", "MovieObject", "*.mpls", and "*.clpi") are damaged, a disc reproduction process is also fatally damaged, such that the backup directory (BACKUP) is designed to pre-store duplicate files of the above-mentioned files as backup files.

In association with the above-mentioned description, a method for reproducing a specific title using the above-mentioned disc file structure is shown in FIG. 2.

If a user enters a title reproduction command in association with a title used as an index file (also called "index table"), reproduction of the title begins. A detailed description thereof will hereinafter be described.

The index file (index.bdmv) includes first playback information "First Playback" indicative of information associated with a first reproduction image when data of a corresponding disc is loaded, top menu information "Top Menu" for providing a menu image, and at least one title information "Title #1~Title #n".

If the optical disc 30 is loaded in the optical recording/reproducing device 10, title menu information associated with the index table is provided to the user via the display 20. If the user selects a specific title or a specific menu contained in a menu image, data reproduction begins according to a scenario pre-defined by a disc manufacturer. In other words, if the user enters a command for reproducing a specific title (e.g., title #1), a specific playlist file is executed according to a command contained in the object file (MovieObject) of the reproduction/management file structure. Thereafter, one or more clips (e.g., Clip #1~Clip#3) constructing the title #1 are reproduced by a specific playitem and/or sub-playitem contained in the playlist file according to the playlist file information.

Figure 3:
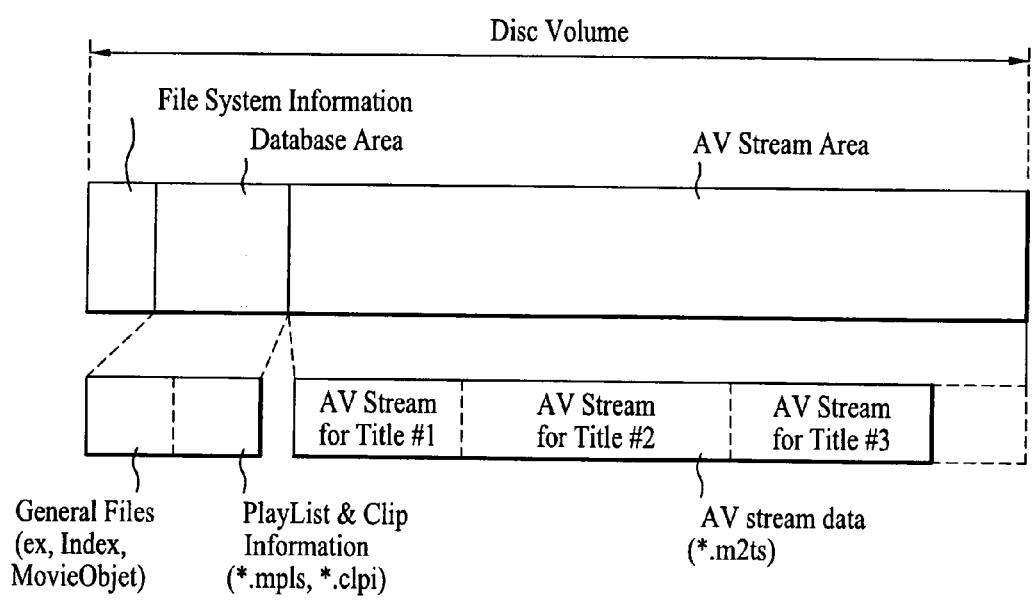
FIG. 3 is a structural diagram illustrating a data record structure of an optical disc acting as a recording medium according to the present invention.

FIG. 3 is a structural diagram illustrating a data record structure recorded in a recording medium according to the present invention. In more detail, FIG. 3 shows a disc record format of information associated with the file structure. As shown in FIG. 3, from the viewpoint of an inner area of the disc, the above-mentioned disc structure sequentially includes a file system information area serving as system information for managing overall files, a database area for recording a playlist file and a clip-info file to reproduce a recorded AV stream (*.m2ts), and an AV stream area for recording a plurality of streams composed of audio data, video data, and graphic data, etc. Particularly, it should be noted that data recorded in the AV stream area may be determined to be original data as previously stated above.

The present invention provides a method and apparatus for simultaneously reproducing original data (e.g., a file structure shown in FIG. 2) recorded in the disc and additional data recorded in the local storage, and a variety of preferred embodiments according to the present invention will hereinafter be described.

Figure 4A:
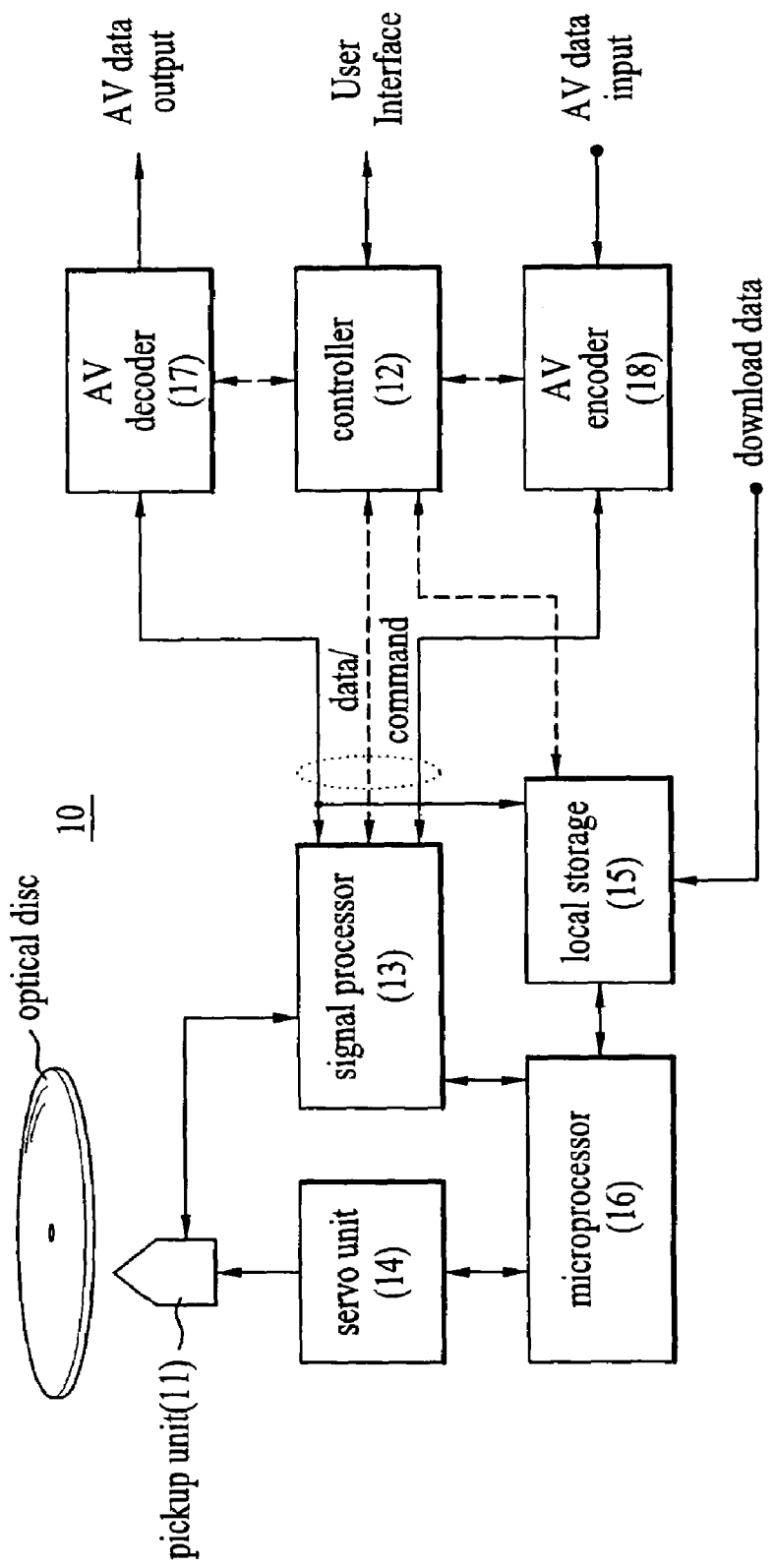
FIG. 4A is a block diagram illustrating an optical recording/reproducing device according to the present invention.

FIG. 4A is a block diagram illustrating the optical recording/reproducing device 10 according to the present invention.

Referring to FIG. 4A, the optical recording/reproducing device 10 includes a pickup unit 11, a servo unit 14, a signal processor 13, and a microprocessor 16. The pickup unit 11 reproduces original data recorded in the optical disc and management information including reproduction/management file information. The servo unit 14 controls operations of the pickup unit 11. The signal processor 13 receives a reproduction signal from the pickup unit 11, restores the received reproduction signal to a desired signal value, or modulates a signal to be recorded into another signal recorded in the optical disc, such that it transmits the restored or modulated result. The microprocessor 16 controls mutual operations of the above-mentioned components.

A controller 12 downloads additional data existing outside of the optical disc upon receiving a command from a user, stores the downloaded additional data in the local storage 15, and configures a virtual file system (VFS) to reproduce the original data recorded in the optical disc and the additional data stored in the local storage. The controller 12 forms a virtual package including the original data and associated additional data using the VFS, and reproduces the original data and/or the additional data using the formed virtual package upon receiving a request from a user.

In association with the above-mentioned description, the local storage includes a binding unit whose additional data associated with original data is configured in disc units, title units, or content units.

The virtual package formed by the controller 12 includes at least one virtual playlist including at least one playitem capable of reproducing a plurality of clips.

In association with the above-mentioned description, a detailed description of the VFS and the virtual package will hereinafter be described with reference to drawings from FIG. 5.

A decoder 17 finally decodes output data (i.e., original data and/or additional data) upon receiving a control signal from the controller 12, and provides the user with the decoded result.

An encoder 18 converts an input signal into a specific format signal (e.g., an MPEG2 transport stream) upon receiving a control signal from the controller 12, and transmits the converted result to the signal processor 13.

The new virtual package may be stored in the local storage 15 such that it can be re-used in future. Also, the new virtual package may be temporarily stored in an additional dynamic memory, and may then be used.

FIG. 4B is a block diagram illustrating an apparatus for reproducing data of an optical disc using a local storage from among overall components contained in the optical recording/reproducing device 10 according to the present invention.

Information stored in the local storage 15 will hereinafter be described. The local storage 15 according to the present invention stores file information (Directory-File Tree Information for Disc_id #n) including directories and files for every individual disc identification (ID) information, and a plurality of additional clips downloaded from an external part. A binding unit of the local storage 15 is formed, and the local storage 15 may store binding unit manifest information for a binding operation associated with a disc file structure (i.e., a disc package).

Specifically, the local storage 15 may include a plurality of file information units (Directory-File for Disc_id #n dependent) to cope with different discs. Therefore, the local storage 15 additionally requires a file system for managing the above-mentioned file information units. Specifically, the file system is also referred to as a local storage file system 41, and the local storage file system 41 is indicative of a system for managing all files stored in the local storage 15.

Therefore, if an optical disc (e.g., disc_ID #1) of a specific disc ID (disc_ID) is loaded in the optical recording/reproducing device 10, the controller 12 contained in the optical recording/reproducing device 10 recognizes ID information of the disc using the pickup unit 11 and the signal processor 13. If the local storage 15 stores file information, the controller reads binding unit file information equal to the loaded disc ID information from among all file information units stored in the local storage 15, forms a virtual package by binding (or combining) the read information and the disc package, and reproduces both the original data of the disc and the additional data of the local storage using the formed virtual package.

Figure 5:
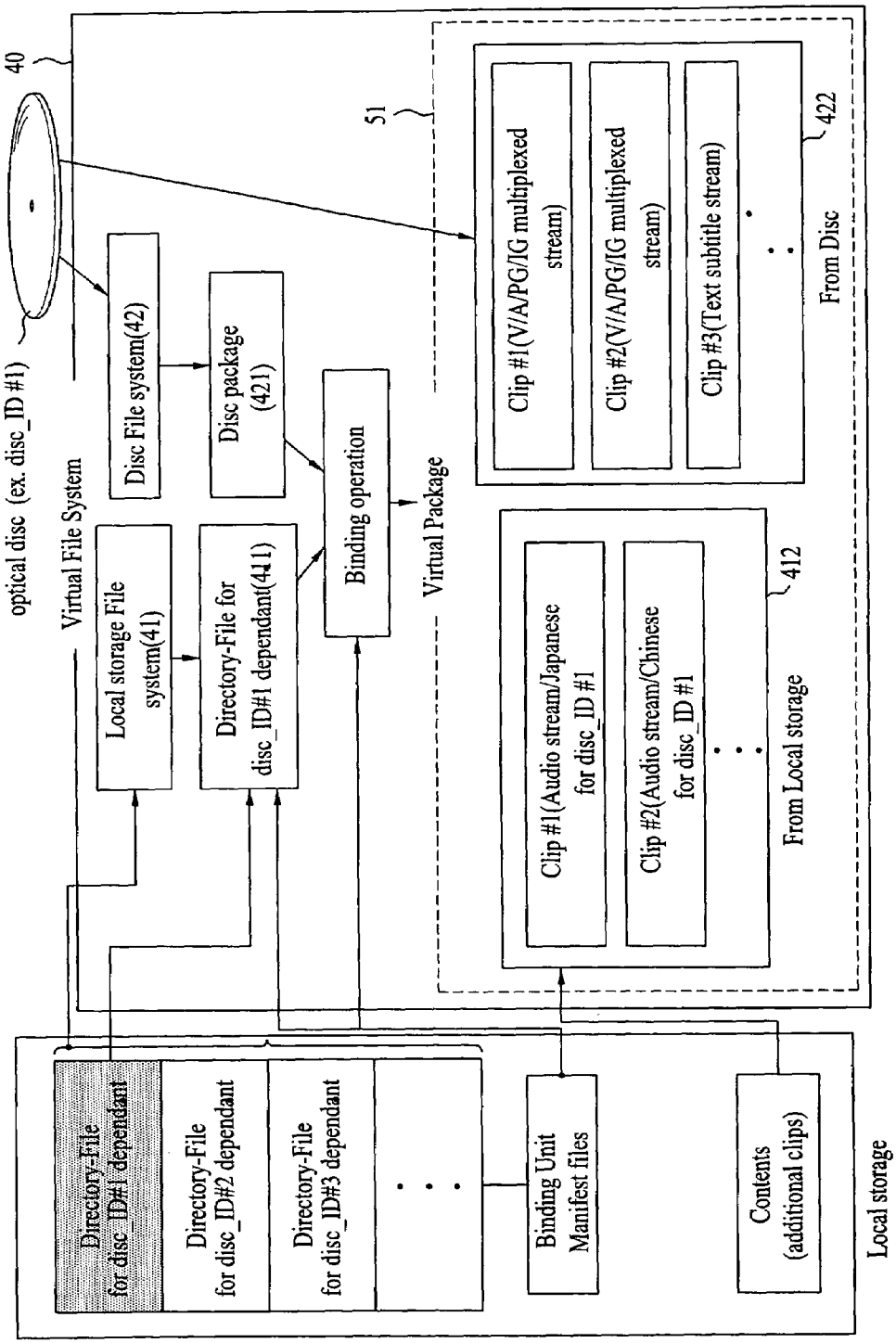
FIG. 5 is a conceptual diagram illustrating a method for forming a virtual package capable of simultaneously reproducing data recorded in a recording medium and data recorded in a local storage according to the present invention.

FIG. 5 is a conceptual diagram illustrating a method for forming the above-mentioned virtual package to simultaneously reproduce data of a recording medium and data of a local storage according to the present invention.

If a specific disc is loaded in the optical recording/reproducing device 10 on the condition that the information and contents shown in FIG. 4B are stored in the local storage 15, the optical recording/reproducing device 10 reads the file system information 41 contained in the local storage 15, and at the same time reads disc file system information 42 including the file structure recorded in the disc, resulting in the creation of the VFS. In more detail, the virtual file system (VFS) is indicative of a file system virtually formed to manage both the file system contained in the local storage 15 and the other file system of the loaded disc.

The optical recording/reproducing device forms a new virtual package to simultaneously reproduce original data recorded in the disc and additional data recorded in the local storage using the above-mentioned virtual file system (VFS). For this purpose, the optical recording/reproducing device 10 reads binding unit manifest information from a file system of the local storage 15, and firstly forms a binding unit according to the binding unit manifest information. The optical recording/reproducing device 10 performs a binding operation which replaces the binding unit manifest information with a disc package of the loaded disc (disc_ID #1), adds the binding unit manifest information to the disc package, or merges the binding unit manifest information with the disc package.

In association with the above-mentioned description, the binding unit manifest files according to the present invention includes a variety of information, for example, "Files and Titles Relation List" information indicative of a relationship between files and titles, name mapping information indicative of mapping locations of all files of the binding unit in the virtual package, progressive playlist information for a progressive playlist, and credential information. Specifically, a file indicated by the aforementioned name mapping information forms the binding unit.

A method for forming the binding unit in data downloaded in the local storage according to the present invention will hereinafter be described.

Figure 6:
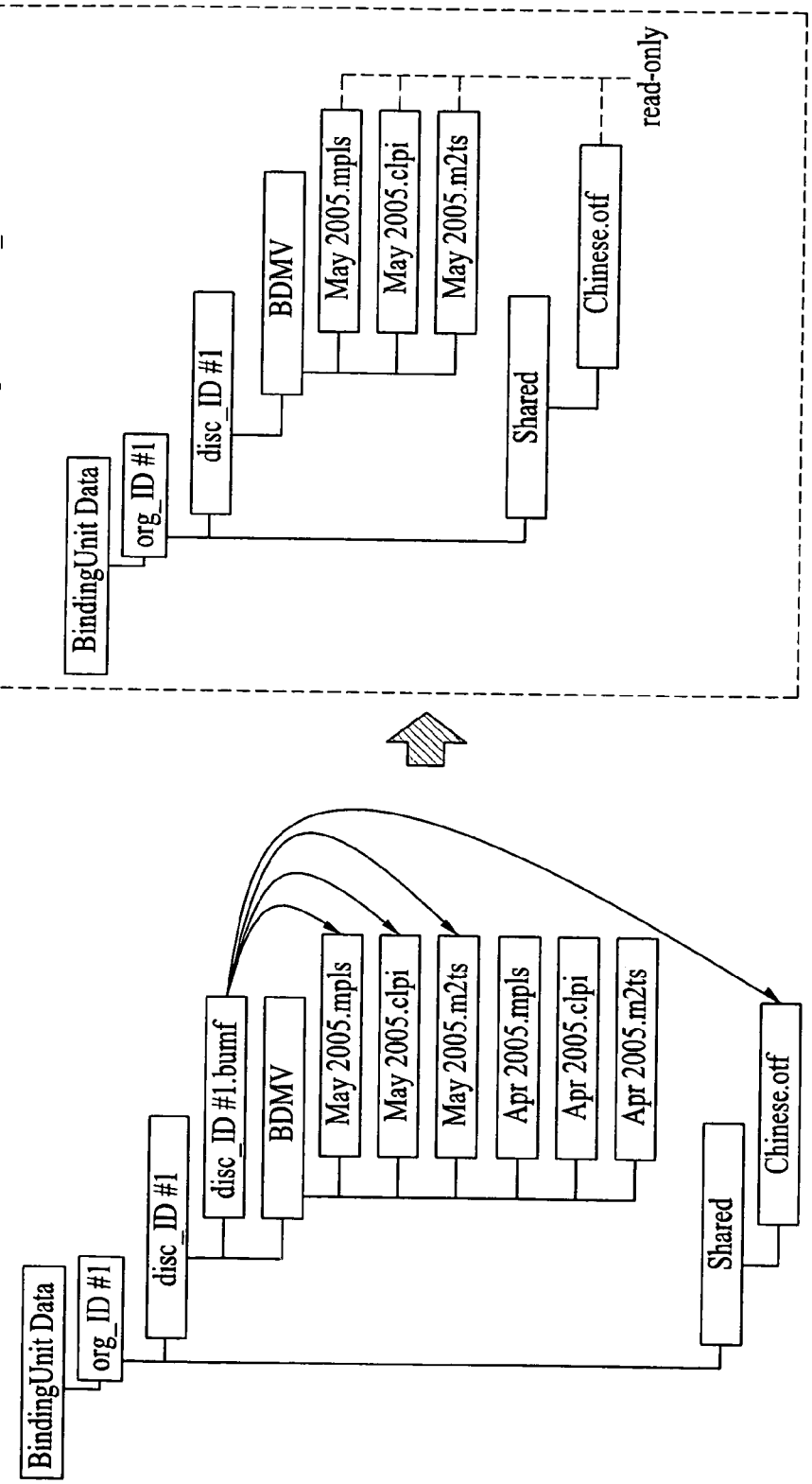
FIG. 6 is a structural diagram illustrating a binding unit of a local storage for forming a virtual package according to the present invention.

FIG. 6 is a structural diagram illustrating a binding unit of a local storage for forming a virtual package according to the present invention.

In association with the above-mentioned description, the above-mentioned local storage file structure of FIG. 6 includes an organization directory (e.g., org_ID #1) indicative of a content provider (CP) equal to a disc author in a binding unit data (BindingUnitData) directory. In other words, the organization directory (e.g., org_ID #1) indicative of the content provider (CP) is contained in the BindingUnitData directory. The organization directory (org_ID #1) includes a disc directory (disc_ID #1) and a shared directory (e.g., Shared). The disc directory (disc_ID #1) is indicative of a unique directory for each disc manufactured by a corresponding content provider (CP), and the shared directory (Shared) is indicative of a directory shared by all discs manufactured by a corresponding content provider (CP).

The disc directory (disc_ID #1) includes a binding unit manifest file (disc_ID #1.bumf) and a BD directory (BDMV). The BD directory (BDMV) includes two playlist files (i.e., May2005.mpls and Apr2005.mpls), two clip-info files (i.e., May2005.clpi and Apr2005.clpi), and two stream files (i.e., May2005.m2ts and Apr2005.m2ts). The shared directory (Shared) includes an AUXDATA (auxiliary data) file (e.g., Chinese.otf).

According to the above-mentioned file structure, the binding unit manifest file (disc_ID #1.bumf) contained in the disc directory (disc_ID #1) includes information for forming the binding unit. As shown in FIG. 6, the aforementioned binding unit manifest file (disc_ID #1.bumf) includes name mapping information indicating specific files (e.g., May2005.mpls, May2005.clpi, and May2005.m2ts) contained in the BD directory (BDMV), and includes other name mapping information indicating a specific file "Chinese.otf" contained in the shared directory. In conclusion, the aforementioned files designated by the name mapping information form the binding unit. In association with the above-mentioned description, it should be noted that all files contained in the formed binding unit cannot be deleted, added, or edited without using the name mapping information.

Figure 7:
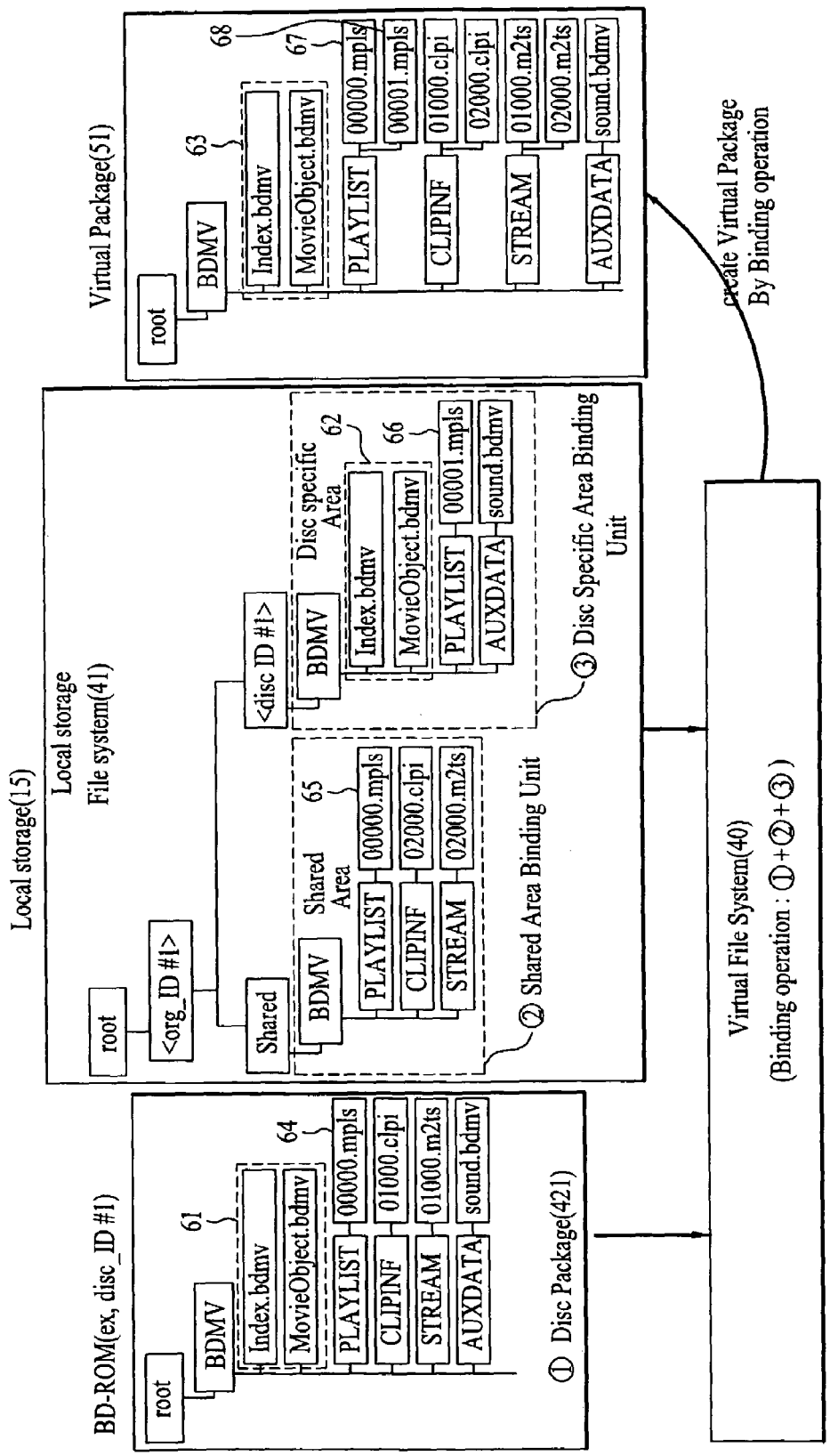
FIG. 7 is a conceptual diagram illustrating a method for forming the virtual package using a virtual file system (VFS) on the basis of a file structure according to the present invention.

FIG. 7 is a conceptual diagram illustrating a method for forming the virtual package using a virtual file system (VFS) on the basis of a file structure according to the present invention.

Referring to FIG. 7, a specific file structure (i.e., the disc package of FIG. 2) is recorded in the loaded disc. A local storage file system 41 is contained in the local storage. The local storage file system 41 includes a binding unit and binding information, which are combined with the loaded disc (e.g., Disc_id #1). As can be seen from FIG. 6, the shared area binding unit and the disc specific area binding unit are formed by the binding unit manifest file.

In association with the above-mentioned description, the term "binding unit" includes the shared area binding unit and the disc specific area unit.

However, it should be noted that the binding unit cannot be operated as a reproduction/management file by itself, differently from the disc package. If it is assumed that the binding unit is designed to perform data reproduction by itself, this data reproduction is similar to data reproduction of the local storage, such that the above-mentioned operations of the binding unit are contrary to the purpose of the present invention for simultaneously reproducing both original data recorded in the disc and additional data recorded in the local storage.

The virtual file system (VFS) 40 performs a binding operation for combining the shared area binding unit and the disc specific area binding unit contained in the binding unit of the local storage with the disc package of the loaded disc using the above-mentioned binding information, such that it forms a new virtual package.

A method for forming the virtual package will hereinafter be described. When forming a new virtual package using the binding operation, the binding operation is executed in the order of the disc specific area binding unit→the shared area binding unit→the disc package. In other words, the first priority of the binding operation corresponds to the disc specific area binding unit, the second priority of the binding operation corresponds to the shared area binding unit, and the last priority of the binding operation corresponds to the disc package.

For example, FIG. 7 shows a binding unit associated with a loaded disc (e.g., disc_ID #1). The shared directory (Shared) includes the playlist file (00000.mpls) 65, a clip (i.e., a clip-info file "02000.clpi") managed by the playlist file (00000.mpls) 65, and a stream file (02000.m2ts). The disc directory (disc_ID #1) includes a file group 62 composed of an index file "index.bdmv" and an object file "Movie Object.bdmv" 62 to construct index table information, a specific playlist file "00001.mpls" 66, and an AUXDATA file "sound.bdmv" for storing auxiliary data (AUXDATA).

The virtual file system 40 performs the binding operation according to the binding information. A file group 61 composed of the index/object files "index.bdmv" and "MovieObject.bdmv" contained in the disc package is replaced with the aforementioned file group 62 composed of the index/object files "index.bdmv" and "MovieObject.bdmv" contained in the disc specific area binding unit, such that the index/object files "index.bdmv" and "MovieObject.bdmv" 63 contained in the virtual package 51 are configured.

In other words, the index/object files "index.bdmv" and "MovieObject.bdmv" 62 contained in the disc specific area binding unit are downloaded from a content provider (CP) acting as an external input source. This means that the content provider (CP) pre-transmits index/object files suitable for a binding structure formed after the binding operation is completed.

When combining the playlist file (00000.mpls) 65 contained in the shared area binding unit with the other playlist file (00000.mpls) 64 contained in the disc package, the playlist file (00001.mpls) 67 is configured in the virtual package by replacing the playlist file 64 with the other playlist file 65 of the shared area binding unit having earlier priority.

The playlist file (00001.mpls) 66 contained in the disc specific area binding unit has a file name different from the playlist file (00000.mpls) 65 of the shared area binding unit and the playlist file (00000.mpls) 64 of the disc package. Therefore, the playlist file (00001.mpls) 66 is additionally appended or added to the newly-formed virtual package, resulting in the configuration of the playlist file (00001.mpls) 68.

A first file structure configured in disc units (i.e., per disc) when a virtual package, a second file structure configured in title units (i.e., per title) when a virtual package is formed by the binding operation, and a third file structure configured in content units (i.e., per content) when a virtual package is formed by the binding operation, will hereinafter be described with reference to FIGS. 8A~10B.

Figure 8A:
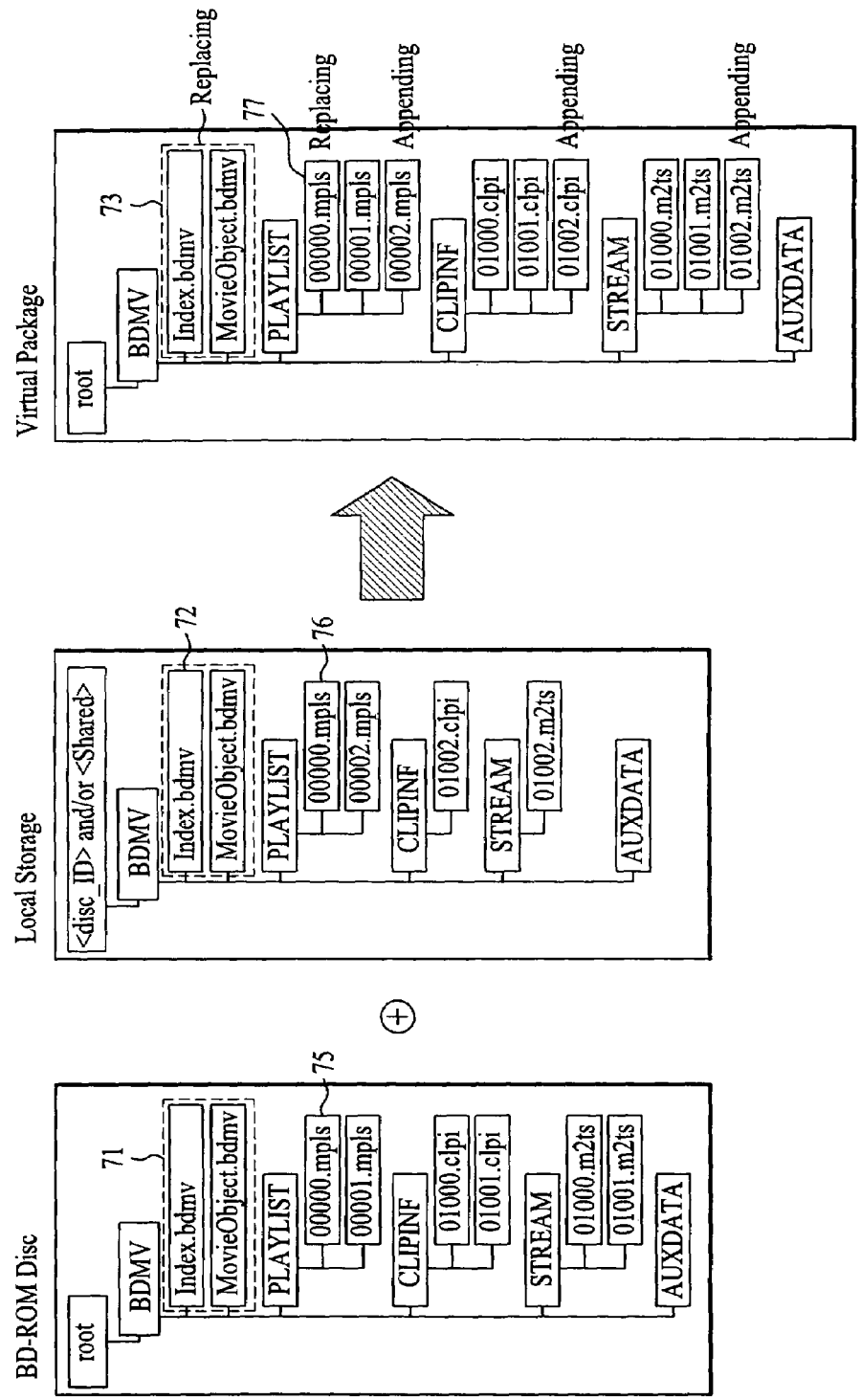
FIGS. 8A~8B are conceptual diagrams illustrating a method for forming/reproducing a virtual package in accordance with a first preferred embodiment of the present invention, specifically, a method for performing a binding operation for combining a binding unit configured in disc units (i.e., a binding unit per disc) with a recording-medium file structure (i.e., a disc package) such that it forms/reproduces a virtual package.
Figure 8B:
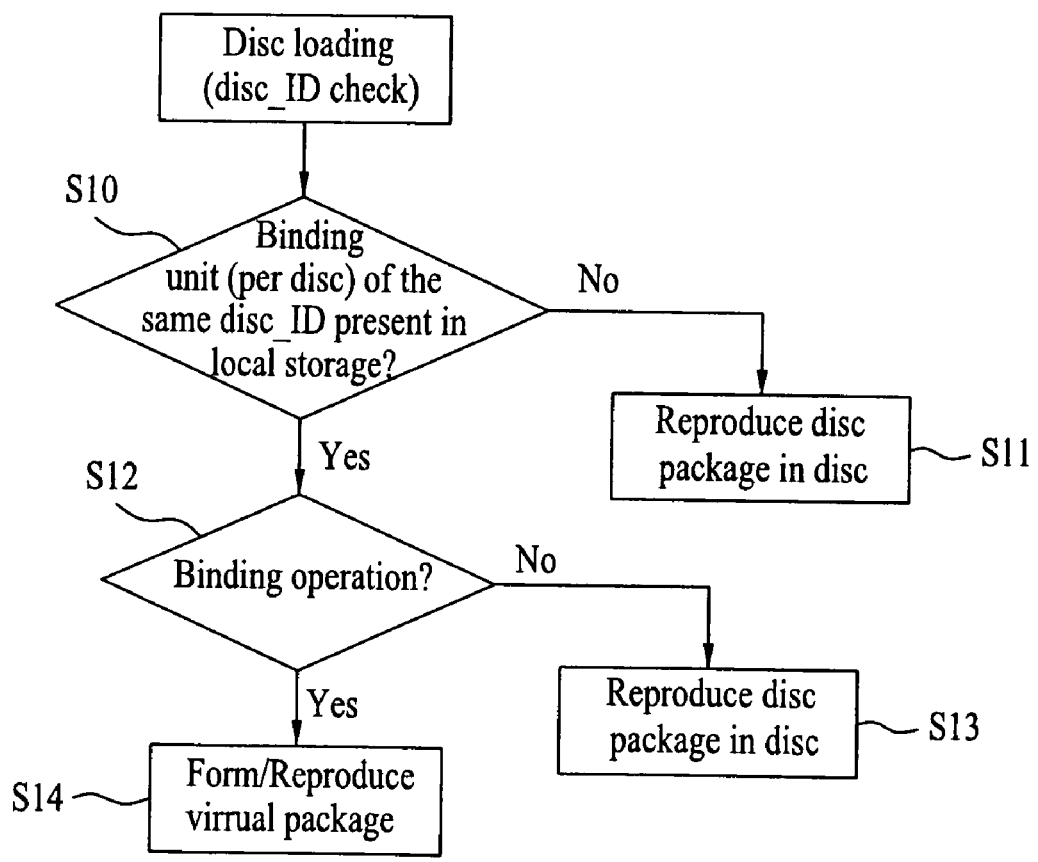

FIGS. 8A~8B are conceptual diagrams illustrating a method for forming/reproducing a virtual package in accordance with a first preferred embodiment of the present invention, specifically, a method for performing a binding operation for combining a binding unit configured in disc units (i.e., a binding unit per disc) with a recording-medium file structure (i.e., a disc package) such that it forms/reproduces a virtual package.

Referring to FIGS. 8A~8B, if the disc is loaded in the optical recording/reproducing device, the optical recording/reproducing device recognizes disc ID (disc_ID) information. For example, the BD-ROM disc equal to the recognized disc includes index/object files "index.bdmv" and "MovieObject.bdmv" 71, playlist files composed of "00000.mpls" 75 and "00001.mpls", clip-info files composed of "01000.clip" and "01001.clpi", stream files composed of "01000.m2ts" and "01001.m2ts", and an AUXDATA file.

After recognizing the aforementioned disc ID information (disc_ID), the optical recording/reproducing device determines whether the binding unit configured in disc units is contained in the same disc_ID file structure of the local storage at step S10. The local storage file structure includes a disc directory (disc_ID) equipped with a disc specific area binding unit, and/or a shared directory (Shared) equipped with shared area binding unit of a content provider (CP). Index/object files "index.bdmv" and "MovieObject.bdmv" 72, playlist files composed of "00000.mpls" 76 and "00002.mpls", a clip-info file "01002.clip", a stream file (01002.m2ts", and an AUXDATA file are contained in the disc directory (disc_ID) and/or the shared directory (Shared). In other words, the local storage file structure has the same directory and file structure as those of the disc.

In association with the above-mentioned description, it is preferable that a single binding unit is contained in the disc directory (disc_ID) or the shared directory (Shared). Preferably, a studio indicative of a content provider (CP) prepares data of database files (including an index table, movies objects, and/or a playlist) suitable for the virtual package formed after the binding operation, and transmits the aforementioned data if the loaded disc is determined to be a disc manufactured by the content provider (CP).

If the binding unit configured in disc units of the same disc ID (disc_ID) is not contained in the local storage at step S10, the optical recording/reproducing device reproduces the disc package S11.

If the binding unit configured in disc units of the same disc ID (disc_ID) is contained in the local storage at step S10, the optical recording/reproducing device determines whether the virtual file system performs a binding operation in consideration of the binding information at step S12. If the binding operation is not performed at step S12, the optical recording/reproducing device reproduces a disc package at step S13. If the binding operation is performed at step S12, the optical recording/reproducing device forms a virtual package, and reproduces the virtual package at step S14.

If the binding unit configured in disc units is contained in the local storage, a method for forming the virtual package, and the formed virtual package will hereinafter be described.

The virtual file system (VFS) performs the binding operation on the basis of the disc package according to the binding information. In this case, the index/object files ("index.bdmv" and "MovieObject.bdmv") 71 contained in the disc package are replaced with index/object files 72 of the disc directory (disc_ID) and/or the shared directory (shared), such that index/object files ("index.bdmv" and "MovieObject.bdmv") 73 of the virtual package are configured.

As previously stated in FIG. 7, the index/object files ("index.bdmv" and "MovieObject.bdmv") 72 are contained in data downloaded from a content provider (CP). Since the content provider (CP) transmits index/object files suitable for a binding structure formed after the binding operation, the index/object files ("index.bdmv" and "MovieObject.bdmv") 72 of the binding unit have the same data as index/object files ("index.bdmv" and "MovieObject.bdmv") 73 of the virtual package.

The binding operation combines the playlist file (00000.mpls) 76 contained in the binding unit with the playlist file (00000.mpls) 75 contained in the disc package. The playlist file (00000.mpls) 76 contained in a binding unit having the same file name as the aforementioned binding unit and the playlist file (00000.mpls) 75 contained in the disc package are replaced with a playlist file (00000.mpls) 75 of the binding unit having earlier priority. A playlist file "00002.mpls" contained in the binding unit having a file name different from that of the aforementioned binding unit is appended or added, such that a plurality of playlist files ("00000.mpls" 77, "00001.mpls", and "00002.mpls") of a newly-formed virtual package are configured.

Figure 9B:
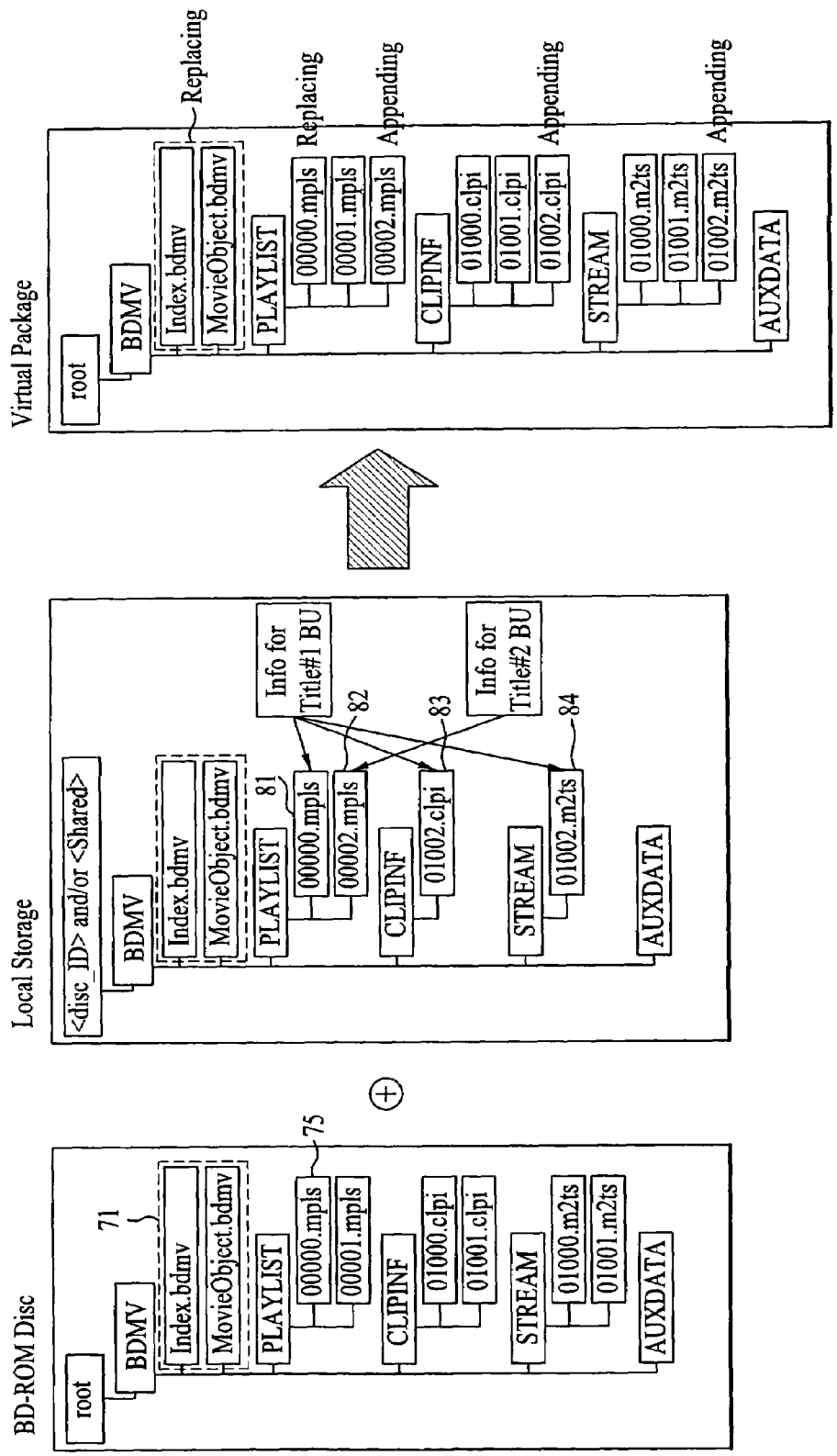
Figure 9C:
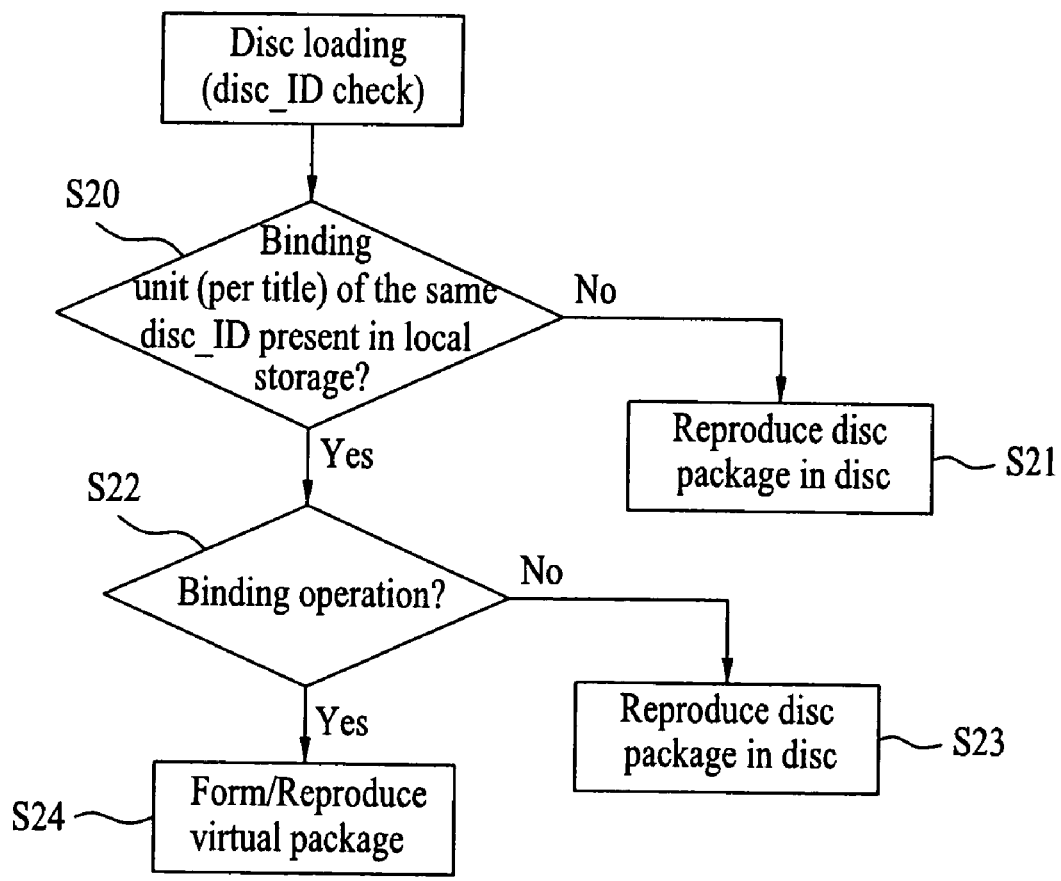

FIGS. 9A~9C are conceptual diagrams illustrating a method for forming/reproducing a virtual package in accordance with a second preferred embodiment of the present invention, specifically, a method for performing a binding operation for combining a binding unit configured in title units (i.e., a binding unit per title) with a recording-medium file structure (i.e., a disc package) such that it forms/reproduces a virtual package.

The second preferred embodiment shown in FIGS. 9A~9C exemplarily shows a binding unit configured in title units (i.e., "Title #1 BU", and "Title #2 BU"). FIGS. 9A~9B show examples having different directory structures. For the convenience of description, recording-medium file structures shown in FIGS. 9A and 9B are equal to that of FIG. 8A, so that a detailed description of the recording-medium file structure will herein be omitted.

FIG. 9A shows a first preferred embodiment of an example in which a binding unit of the local storage file structure is configured in title units. The disc directory (disc_ID) and the shared directory (Shared) include directories for every title. In other words, a binding unit directory of the title #1 (Title #1 binding unit, hereinafter referred to as "Title #1 BD") and a binding unit directory of the title #2 (Title #2 binding unit, hereinafter referred to as "Title #2 BD") are configured separately from each other.

Therefore, a recording-medium file structure indicative of a specific structure composed of recording medium directories and files is different from a local-storage binding unit file structure indicative of directories and files of the local storage binding unit. However, the priority of files contained in the local-storage binding unit is higher than that of the recording medium. Therefore, if a specific file contained in the local storage binding unit has the same file name as that of the recording medium files in the same manner as in FIGS. 8A~8B in which the binding operation is performed in disc units, the binding mechanism for performing the binding operation performs the replacing operation between the files. Otherwise, if a specific file contained in the local storage binding unit has a file name different from that of the recording medium files, the binding mechanism performs the appending operation between the files.

FIG. 9B shows a second preferred embodiment in which the binding unit of the local storage file structure is configured in title units. The disc directory (disc_ID) and/or the shared directory (shared) have the same directory and file structure as those of the recording medium. However, it should be noted that a binding unit of the title #1 (Title #1 binding unit, hereinafter referred to as a "Title #1 BD") and a binding unit of the title #2 (Title #2 binding unit, hereinafter referred to as a "Title #2 BD") are distinguished from each other by additional information of individual titles.

For example, as shown in FIG. 9B, the binding unit information of the title #1 (Information for Title #1 Binding Unit) indicates a playlist file (00000.mpls) 81, a clip-info file (01002.clpi) 83, and a stream file (01002.m2ts) 84. The binding unit information of the title #2 (Information for Title #2 Binding Unit) indicates the playlist file (00002.mpls) 82.

Therefore, the preferred embodiment shown in FIG. 9B is different from the preferred embodiment shown in FIG. 9A in which individual titles have different directories. However, the priority of files contained in the local-storage binding unit is higher than that of the recording medium in the preferred embodiment shown in FIG. 9B. Therefore, the binding mechanism for performing the binding operation is equal to the aforementioned binding mechanism of FIGS. 8A~8B in which the binding operation has been performed in disc units.

In association with the above-mentioned description, the virtual package formed after the binding operation shown in FIGS. 9A~9B is equal to that of FIG. 8A, so that a detailed description thereof will herein be omitted for the convenience of description.

FIG. 9C is a flow chart illustrating a method for forming a virtual package by combining a binding unit configured in title units with a recording medium file structure, such that it reproduces data of the recording medium and data of the local storage according to the present invention.

Referring to FIG. 9C, if the disc is loaded in the optical recording/reproducing device, the optical recording/reproducing device recognizes disc ID (disc_ID) information. After recognizing the aforementioned disc ID information (disc_ID), the optical recording/reproducing device determines whether the binding unit configured in title units of the same disc_ID information is contained in the local storage at step S20. The binding unit is contained in the disc directory (disc_ID) and/or the shared directory (Shared) of the local storage. Specifically, the content provider (CP) transmits files of individual titles to the local storage of the optical recording/reproducing device so as to reproduce data of individual titles. The aforementioned files of individual titles form binding units, respectively.

If the binding unit configured in title units of the same disc ID (disc_ID) is not contained in the local storage at step S20, the optical recording/reproducing device reproduces the disc package S21. If the binding unit configured in title units of the same disc ID (disc_ID) is contained in the local storage at step S20, the optical recording/reproducing device determines whether the virtual file system performs a binding operation in consideration of the binding information at step S22. In this case, the binding unit contained in the local storage may be divided into smaller binding units according to individual title units as shown in FIG. 9A, or may represent files of individual files using additional information whereas its directory/file structure is equal to that of the recording medium as shown in FIG. 9B.

If the execution of the binding operation is not requested at step S22, the optical recording/reproducing device reproduces data of the recording medium using only the disc package at step S23.

Otherwise, if the execution of the binding operation is required at step S22, the optical recording/reproducing device forms a virtual package, and reproduces data of the recording medium and data of the local storage using the formed virtual package at step S24.

If the recording medium file structure has the same file name as that of the local storage file structure, the directory priority is applied to a process for forming a virtual package, such that the file replacement is executed. The directory priority is in the order of the disc directory (disc_ID)→the shared directory→the BD-ROM directory. If the recording medium file structure has a file name different from that of the local storage file structure, the appending operation between files is performed so that a virtual package is formed. Preferably, the virtual package may be re-formed when a title is changed to another title.

Figure 10A:
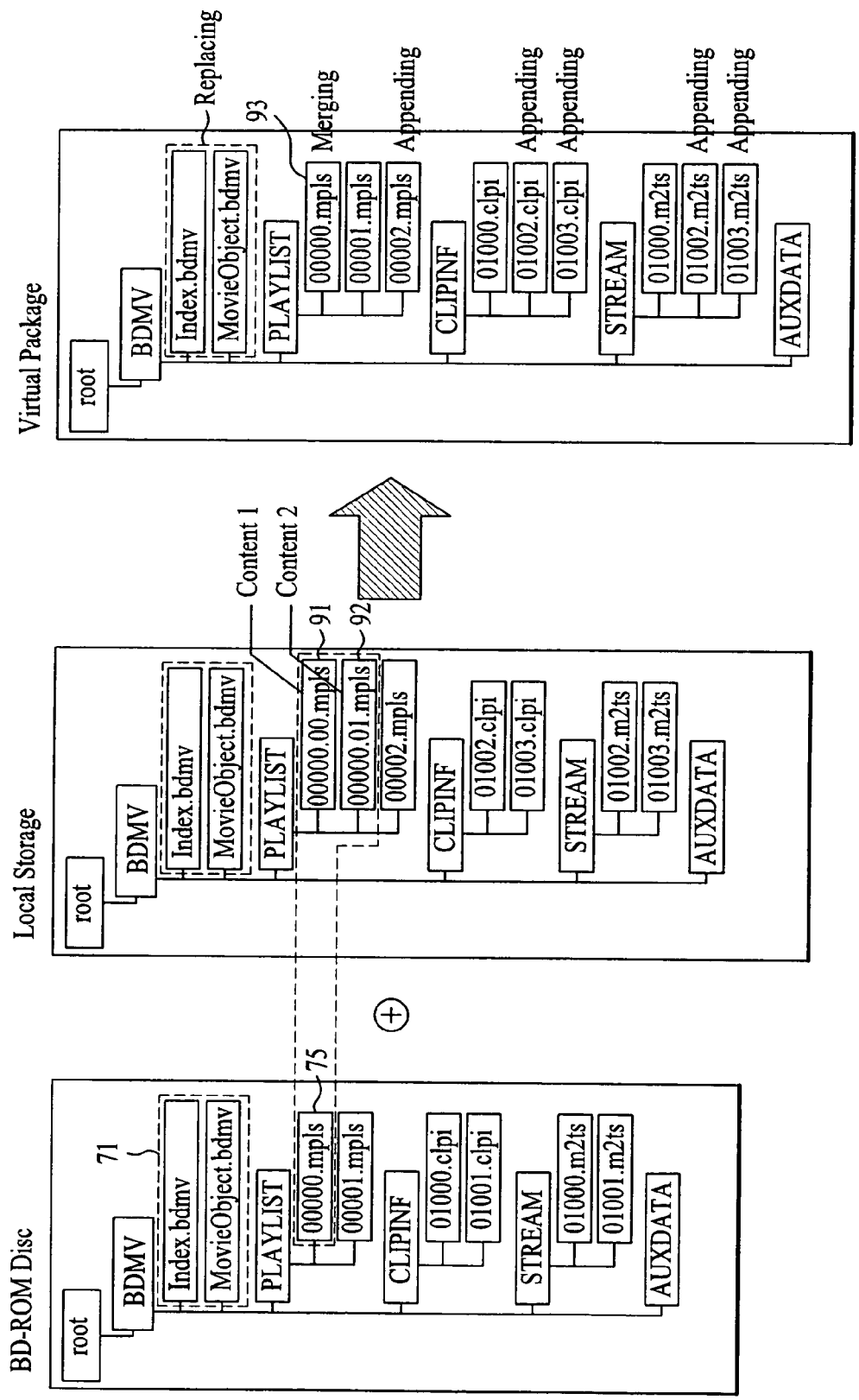
FIGS. 10A~10B are conceptual diagrams illustrating a method for forming/reproducing a virtual package in accordance with a third preferred embodiment of the present invention, specifically, a method for performing a binding operation for combining a binding unit configured in content units (i.e., a binding unit per content) with a recording-medium file structure (i.e., a disc package) such that it forms/reproduces a virtual package.
Figure 10B:
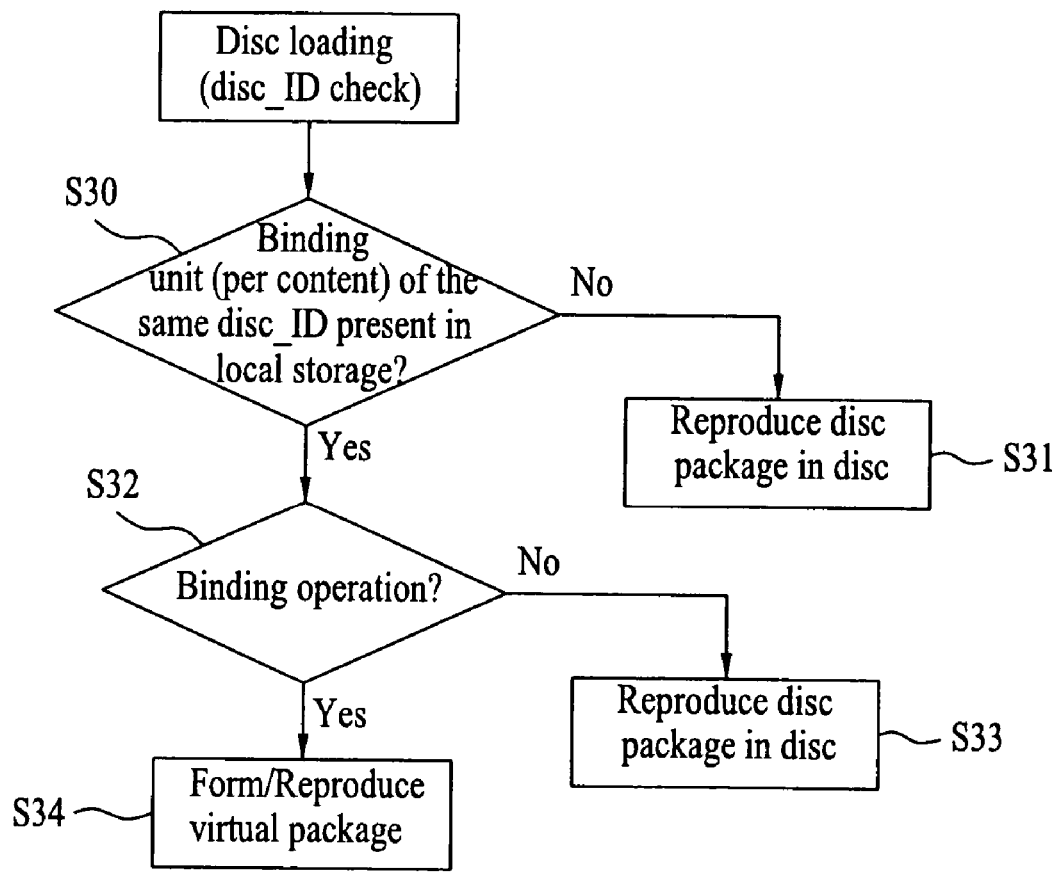

FIGS. 10A~10B are conceptual diagrams illustrating a method for forming/reproducing a virtual package in accordance with a third preferred embodiment of the present invention, specifically, a method for performing a binding operation for combining a binding unit configured in content units (i.e., a binding unit per content) with a recording-medium file structure (i.e., a disc package) such that it forms/reproduces a virtual package.

In association with the above-mentioned description, the recording medium file structure of FIG. 10A is equal to that of FIG. 8A, so that a detailed description thereof will herein be omitted for the convenience of description.

FIG. 10A shows a preferred embodiment in which the binding unit of a local storage file structure is configured in content units (i.e., Per Content). Referring to FIG. 10A, the index file "index.bdmv" and the object file "MovieObject.bdmv" are contained in each of the disc directory (disc_ID) and the shared directory (Shared). Playlist files (00000.00.mpls: 91, 00000.01.mpls:92, and 00002.mpls) are contained in the playlist directory (PLAYLIST). The playlist file (00000.00.mpls) 91 is indicative of a playlist file of a first content (Content 1), and the playlist file (00000.01.mpls) 92 is indicative of a playlist file of a second content (Content 2).

The binding unit of the local storage file structure includes clip-info files (01002.clpi, 01003.clpi) contained in the clip-info directory (CLIPINF), stream files (01002.m2ts, 01003.m2ts) contained in the stream directory (STREAM), and an AUXDATA directory.

Therefore, the local storage file structure is conceptually equal to the recording medium file structure (BD-ROM disc). However, some files downloaded in the local storage file structure include partial- or corrected-information for content data. The partial- or corrected-information performs a merging process to form a virtual package.

Therefore, the virtual package formed after the binding unit configured in content unit is combined with the recording medium file structure (BD-ROM disc) is as follows. The index file "index.bdmv" and the object file "MovieObject.bdmv" are contained in the virtual package, playlist files (00000.mpls:93, 00001.mpls, and 00002.mpls) are contained in the playlist directory (PLAYLIST). The aforementioned playlist file (00000.mpls) 93 is indicative of a playlist file formed when the recording medium playlist file (00000.mpls) 75 is merged with not only the playlist file (00000.00.mpls) 91 of the first content (Content 1) of the local storage binding unit, but also the playlist file (00000.01.mpls) 92 of the second playlist file (Content 2) of the same.

Clip-info files (01000.clpi, 01002.clpi, and 01003.clpi) are contained in the clip-info directory (CLIPINF), and the stream files (01000.m2ts, 01002.m2ts, and 01003.m2ts) are contained in the stream directory (STREAM), such that the virtual package is formed. In more detail, the clip-info file (01001.clpi) and the stream file (01001.m2ts) contained in the BD-ROM disc are deleted, and clip-info files (01002.clpi and 01003.clpi) and stream files (01002.m2ts and 01003.m2ts) of the binding unit are added or appended, such that the aforementioned virtual package is formed.

FIG. 10B is a flow chart illustrating a method for forming a virtual package by combining a binding unit configured in content units with a recording medium file structure, such that it reproduces data of the recording medium and data of the local storage according to the present invention.

Referring to FIG. 10B, if the disc is loaded in the optical recording/reproducing device, the optical recording/reproducing device recognizes disc ID (disc_ID) information. After recognizing the aforementioned disc ID information (disc_ID), the optical recording/reproducing device determines whether the binding unit configured in content units of the same disc_ID information is contained in the local storage at step S30. The binding unit is contained in the disc directory (disc_ID) and/or the shared directory (Shared) of the local storage.

If the binding unit configured in content units of the same disc ID (disc_ID) is not contained in the local storage at step S30, the optical recording/reproducing device reproduces the disc package S31.

Otherwise, if the binding unit configured in content units of the same disc ID (disc_ID) is contained in the local storage at step S30, the optical recording/reproducing device determines whether the virtual file system performs a binding operation for combining the binding unit configured in content units with the recording medium file structure in consideration of the binding information at step S32.

If the execution of the binding operation is not requested at step S32, the optical recording/reproducing device reproduces data of the disc package at step S33.

Otherwise, if the execution of the binding operation is required at step S32, the optical recording/reproducing device forms a virtual package, and reproduces data of the formed virtual package at step S34.

If the recording medium file structure has the same file name as that of the local storage file structure, the directory priority is applied to a process for forming a virtual package, such that the file replacement is executed. The directory priority is in the order of the disc directory (disc_ID)→the shared directory→the BD-ROM directory. If the recording medium file structure has a file name different from that of the local storage file structure, the appending operation between files is performed so that a virtual package is formed. Preferably, the virtual package may be re-formed when a title is changed to another title.

As apparent from the above description, a method and apparatus for reproducing data from a recording medium using a local storage according to the present invention can effectively reproduce original data recorded in a recording medium and additional data recorded in a local storage, resulting in the creation of more convenient functions for a user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for reproducing data from a recording medium using a local storage, comprising:
   downloading data from an external source;
   storing the downloaded data in the local storage;
   forming a local storage file structure from the downloaded data stored in the local storage, the local storage file structure including an organization directory for a content provider, the organization directory including a disc directory for a disc manufactured by the content provider and a shared directory shared by discs manufactured by the content provider, at least one of the disc directory and the shared directory including a plurality of binding units;
   binding the plurality of binding units with files contained in the recording medium using binding information to form a virtual package, wherein a file of the plurality of binding units has binding priority when a name of the file contained in the plurality of binding units is equal to a name of a file contained in the recording medium; and
   reproducing data recorded in the recording medium and data stored in the local storage using the formed virtual package.

2. The method according to claim 1, wherein the binding information is included in a binding unit manifest file.

3. The method according to claim 2, wherein the binding unit manifest file includes name mapping information associated with files contained in the binding unit.

4. The method according to claim 1, wherein the binding priority of the file of the disc directory is higher than that of the shared directory.

5. The method according to claim 4, further comprising:
   if the same file names are contained in the recording medium and the binding unit, forming the virtual package using the file having higher binding priority.

6. The method according to claim 5, further comprising:
   replacing the file contained in the recording medium with the file contained in the binding unit according to the binding priority.

7. The method according to claim 4, further comprising:
   if different file names are contained in the recording medium and the binding unit, forming the virtual package using all files irrespective of the binding priority.

8. The method according to claim 1, wherein the binding includes
replacing a first index file and a first object file of the recording medium with a second index file and a second object file contained in the binding unit.

9. The method according to claim 1, wherein the binding includes
performing the binding in disc units.

10. The method according to claim 1, wherein the binding includes
performing the binding in title units.

11. The method according to claim 1, wherein the binding includes
performing the binding in content units.

12. The method according to claim 1, wherein the binding and the reproducing are executed by a virtual file system.

13. A method for forming a virtual package, comprising:
downloading data from an external source;
storing the downloaded data in a local storage;
forming a local storage file structure from the downloaded data stored in the local storage, the local storage file structure including an organization directory for a content provider, the organization directory including a disc directory for a disc manufactured by the content provider and a shared directory shared by discs manufactured by the content provider, at least one of the disc directory and the shared directory including a plurality of binding units; and
binding the plurality of binding units with files contained in the recording medium, to form a virtual package, wherein a file of the plurality of binding units has binding priority when a name of the file contained in the plurality of binding units is equal to a name of a file contained in the recording medium.

14. The method according to claim 13, wherein a binding unit manifest file is downloaded from the external source.

15. The method according to claim 14, the binding unit manifest file includes information indicating a file to be bound from files contained in the local storage.

16. The method according to claim 15, wherein the binding unit manifest file includes name mapping information by which a file having a specific file name in the local storage indicates a new file name contained in the virtual package.

17. The method according to claim 16, wherein
if the new file name indicated by the name mapping information contained in the binding unit manifest file is equal to a specific file name contained in the recording medium, a file indicated by the binding unit manifest file is contained in the virtual package.

18. An apparatus for reproducing data from a recording medium using a local storage, comprising:
a pickup unit configured to read data from the recording medium;
the local storage configured to store data associated with the data in the recording medium; and
a controller configured to
form a local storage file structure from the data stored in the local storage, the local storage file structure including an organization directory for a content provider, the organization directory including a disc directory for a disc manufactured by the content provider and a shared directory shared by discs manufactured by the content provider, at least one of the disc directory and the shared directory including a plurality of binding units, and
bind the plurality of binding units with files contained in the recording medium using binding information to form a virtual package, wherein a file of the plurality of binding units has binding priority when a name of the file contained in the plurality of binding units is equal to a name of a file contained in the recording medium.

19. The apparatus of claim 18, wherein at least one of the disc directory and the shared directory includes a first binding unit directory including a first binding unit for a first title and a second binding unit directory including a second binding unit for a second title.

20. The apparatus of claim 18, wherein the plurality of binding units are distinguished from each other by additional information for a plurality of titles.

21. The method of claim 1, wherein at least one of the disc directory and the shared directory includes a first binding unit directory including a first binding unit for a first title and a second binding unit directory including a second binding unit for a second title.

22. The method of claim 1, wherein the plurality of binding units are distinguished from each other by additional information for a plurality of titles.

23. The method of claim 13, wherein at least one of the disc directory and the shared directory includes a first binding unit directory including a first binding unit for a first title and a second binding unit directory including a second binding unit for a second title.

24. The method of claim 13, wherein the plurality of binding units are distinguished from each other by additional information for a plurality of titles.

* * * * *